United States Patent
Sasaki et al.

(10) Patent No.: US 9,648,360 B2
(45) Date of Patent: May 9, 2017

(54) RELAY APPARATUS, RECORDING MEDIUM STORING PROGRAM FOR RELAY APPARATUS, INFORMATION PROCESSING METHOD, AND INFORMATION PROCESSING SYSTEM

(75) Inventors: Hiroyuki Sasaki, Chita (JP); Masafumi Miyazawa, Nagoya (JP); Yusuke Shimada, Inazawa (JP); Takeshi Nagasaki, Nagoya (JP); Katsuaki Ito, Nagoya (JP); Satoshi Watanabe, Nagoya (JP); Kazutaka Yamamoto, Nagoya (JP); Hirokazu Banno, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/363,294

(22) Filed: Jan. 31, 2012

(65) Prior Publication Data

US 2012/0254368 A1 Oct. 4, 2012

(30) Foreign Application Priority Data

Mar. 30, 2011 (JP) ................................ 2011-074582

(51) Int. Cl.
*G06F 15/16* (2006.01)
*H04N 21/2343* (2011.01)
(Continued)

(52) U.S. Cl.
CPC ..... *H04N 21/234309* (2013.01); *H04L 67/06* (2013.01); *H04L 67/2823* (2013.01); *H04N 21/47202* (2013.01); *H04N 21/8153* (2013.01)

(58) Field of Classification Search
CPC ................ H04L 67/2823; H04L 65/60; H04N 21/234309; H04N 21/47202; H04N 21/8153
(Continued)

(56) References Cited

U.S. PATENT DOCUMENTS 8,578,261 B1 * 11/2013 Gupta et al. .................. 715/208
9,001,366 B2    4/2015 Sasaki
(Continued)

FOREIGN PATENT DOCUMENTS

JP         2002-073466 A    3/2002
JP         2003-91393 A     3/2003
(Continued)

OTHER PUBLICATIONS

Japan Patent Office, Office Action for Japanese Patent Application No. 2011-074582 (counterpart to above-captioned patent application), mailed Mar. 26, 2013.
(Continued)

*Primary Examiner* — Shean Tokuta
(74) *Attorney, Agent, or Firm* — Merchant & Gould P.C.

(57) ABSTRACT

A relay apparatus configured to communicate with a server which transmits contents corresponding to identification information received by the server, and a terminal which acquires the contents corresponding to the identification information, the relay apparatus comprises: a communication unit configured to communicate with the server and the terminal; and a processor configured to: receive first identification information from the server through the communication unit; determine whether first contents corresponding to the received first identification information complies with a first format or a second format; transmit the first identification information to the terminal through the communication unit if the processor determines that the first
(Continued)

contents complies with the first format; and transmits, to the terminal through the communication unit, second identification information corresponding to second contents which is acquired by converting the first contents if the processor determines that the first contents complies with the second format.

4 Claims, 11 Drawing Sheets

(51) Int. Cl.
*H04L 29/08* (2006.01)
*H04N 21/472* (2011.01)
*H04N 21/81* (2011.01)

(58) Field of Classification Search
USPC .......................................................... 709/219
See application file for complete search history.

(56) References Cited

U.S. PATENT DOCUMENTS

| | | | |
|---|---|---|---|
| 2002/0026500 A1* | 2/2002 | Kanefsky et al. ............ | 709/219 |
| 2002/0175841 A1* | 11/2002 | Koike .............................. | 341/55 |
| 2003/0053118 A1 | 3/2003 | Muramoto et al. | |
| 2004/0172376 A1* | 9/2004 | Kobori et al. .................... | 707/1 |
| 2005/0235077 A1 | 10/2005 | Kubota | |
| 2006/0072721 A1* | 4/2006 | Wisniewski ............... | 379/88.22 |
| 2006/0179413 A1 | 8/2006 | Eifler et al. | |
| 2006/0232814 A1 | 10/2006 | Shao et al. | |
| 2007/0112938 A1* | 5/2007 | Belimpasakis ............... | 709/219 |
| 2007/0124781 A1* | 5/2007 | Casey et al. .................... | 725/94 |
| 2007/0223051 A1* | 9/2007 | Henry et al. ................. | 358/407 |
| 2008/0077625 A1 | 3/2008 | Ferlitsch | |
| 2008/0082677 A1* | 4/2008 | Miyazawa et al. ........... | 709/229 |
| 2008/0137126 A1 | 6/2008 | Yoshida | |
| 2008/0320173 A9* | 12/2008 | Matsushima et al. ............ | 710/1 |
| 2009/0024626 A1* | 1/2009 | Takei ................................. | 707/9 |
| 2012/0081743 A1 | 4/2012 | Watanabe et al. | |
| 2012/0084402 A1 | 4/2012 | Ito et al. | |
| 2012/0254368 A1 | 10/2012 | Sasaki et al. | |
| 2013/0202222 A1 | 8/2013 | Saito | |
| 2013/0287371 A1* | 10/2013 | Choi et al. .................... | 386/353 |
| 2014/0185087 A1 | 7/2014 | Hayashi | |

FOREIGN PATENT DOCUMENTS

| | | |
|---|---|---|
| JP | 2003-216390 A | 7/2003 |
| JP | 2005-235035 A | 9/2005 |
| JP | 2005-269250 A | 9/2005 |
| JP | 2005-292903 A | 10/2005 |
| JP | 2006-260009 A | 9/2006 |
| JP | 2006-260335 A | 9/2006 |
| JP | 2007-55051 A | 3/2007 |
| JP | 2008-152660 A | 7/2008 |
| JP | 2009-145974 A | 7/2009 |
| JP | 2012-209802 A | 10/2012 |

OTHER PUBLICATIONS

Office Action issued in related U.S. Appl. No. 13/757,341 on Apr. 27, 2015.
U.S. Office Action (Notice of Allowance) issued in related U.S. Appl. No. 13/757,341, Feb. 17, 2016.
Notification of Reason for Refusal issued in in related Japanese Application No. 2012-124821, Jan. 26, 2016.
Office Action issued in related Japanese Application No. 2012-022116, mailed Dec. 1, 2015.
U.S. Office Action issued in related U.S. Appl. No. 15/171,205 on Jan. 31, 2017.

\* cited by examiner

FIG. 4A FILE SELECTION SCREEN REQUEST

```
GET /api/photolist HTTP/1.1  ~ 401
Host: service.bro.com  ~ 402
Accept: image/jpeg, image/tiff  ~ 404
```

FIG. 4B FILE SELECTION SCREEN REQUEST

```
GET /api/photolist HTTP/1.1  ~ 401
Host: service.bro.com  ~ 402
User-Agent: B/1.0/MFC-900  ~ 406
```

FIG. 4C FILE LIST

```
<album>
  <title>vacation</title>
  <photo>
    <title>mountain1</title>                                    408a
    <thumbnail type='image/jpeg'                                 408b
      src='http://service1.com/userid/albums/vacation/thumbs/mountain1.jpg' />  ⎫
    <content id='987854361'>                               410  ⎬ 408
  </photo>                                                      ⎭
  <photo>
    <title>mountain2</title>                                    408a
    <thumbnail type='image/png'                                  408b
      src='http://service1.com/userid/albums/vacation/thumbs/mountain2.png' />  ⎫
    <content id='345278857'>                               410  ⎬ 408
  </photo>                                                      ⎭
  ...
</album>
```

FIG. 4D CONVERTED THUMBNAIL SPECIFYING INFORMATION 412

```
                          412a    412b
<thumbnail type='image/jpeg'
  src='http://service.bro.com/convert/png2jpeg?org=http://service1.com/userid/albums/vacation/thumbs/mountain2.png' />
                    413a                                        413b                                         408b
```

FIG. 4E ELECTRONIC FILE INFORMATION 414

```
<content type='image/jpeg'  src='http://service1.com/userid/albums/vacation/thumbs/mountain1.jpg' />
          414a                                          414b
```

FIG. 4F CONVERTED ELECTRONIC FILE INFORMATION 414

```
<content type='image/jpeg' src='http://service.bro.com/convert/png2jpg?org=http://service1.com/userid/albums/vacation/thumbs/mountain2.png' />
          414a                         413a                                      415b                                                 415c
```

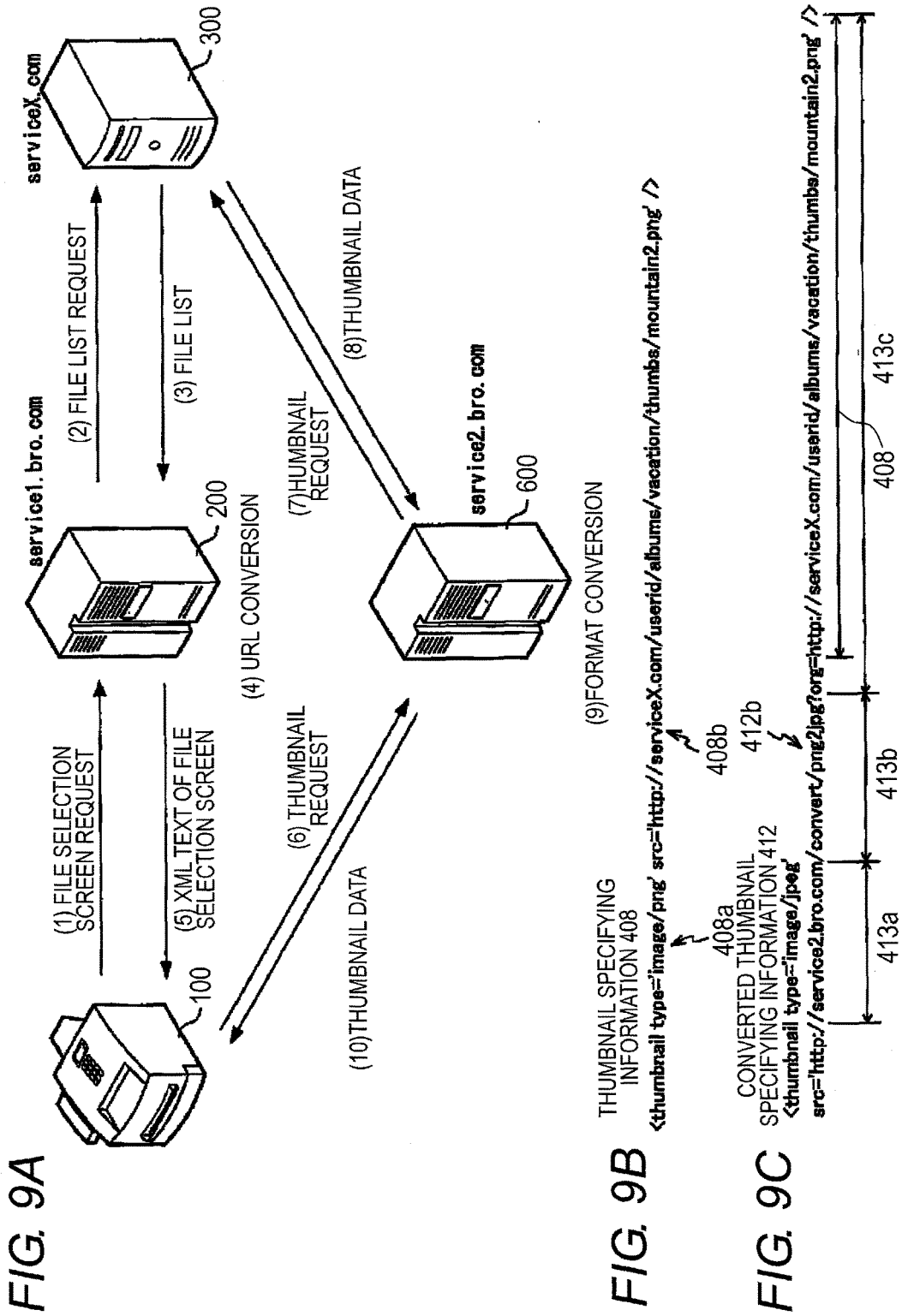

FIG. 10

```
<album>
    <title>vacation</title>
    <photo>
        <title>mountain1</title>
        408 —— <thumbnail type='image/jpeg' src='http://service1.com/userid/albums/vacation/thumbs/mountain1.jpg' />
        410 —— <content id='98785436' type='image/jpeg' src='http://service1.com/userid/albums/vacation/org/mountain1.jpg'>
    </photo>
    <photo>
        <title>mountain2</title>
        408 —— <thumbnail type='image/png' src='http://service1.com/userid/albums/vacation/thumbs/mountain2.png' />
        410 —— <content id='34527865' type='image/png' src='http://service1.com/userid/albums/vacation/org/mountain2.png'>
    </photo>
    ...
</album>
```

407 { 410a 410b 410c }

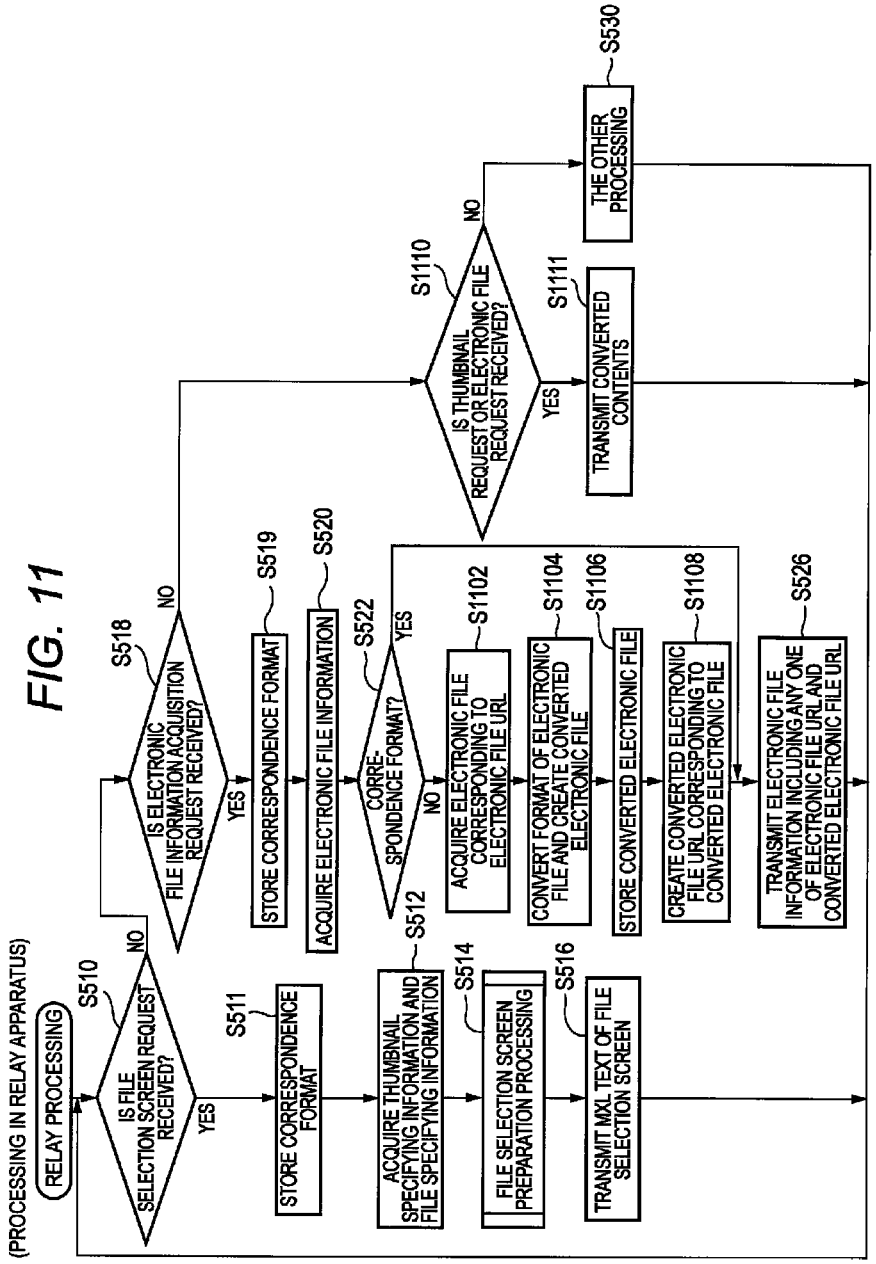

RELAY APPARATUS, RECORDING MEDIUM STORING PROGRAM FOR RELAY APPARATUS, INFORMATION PROCESSING METHOD, AND INFORMATION PROCESSING SYSTEM

CROSS-REFERENCE TO RELATED APPLICATION

This application is based upon and claims the benefit of priority of Japanese Patent Application No. 2011-074582 filed on Mar. 30, 2011, the contents of which are incorporated herein by reference in its entirety.

BACKGROUND

The present disclosure relates to a relay apparatus, a recording medium storing a program for a relay apparatus, an information processing method and an information processing system Generally, a communication apparatus that uploads an electronic file of a read image to a server or a communication apparatus that prints an electronic file downloaded from a server has been known.

Meanwhile, in recent years, an electronic file storing service has been spread which can store an electronic file in a data server on a network prepared by a service provider. For example, Picasa (registered trademark) web album, flickr (registered trademark) may be exemplified. A user may upload a desired electronic file to the electronic file storing server or download a desired electronic file from the electronic file storing server with a personal computer having a web browser. When downloading image data from the electronic file storing server to the personal computer, the user can select a size of an image to be formed by the image data and then download the image data. Most of the electronic file storing services release independent APIs (Application Program Interfaces). The other providers can use the same to provide users with a new service in cooperation with the electronic file storing services.

SUMMARY

Under such circumstances, such a service can be considered which downloads a desired electronic file to the communication apparatus from the electronic file storing server provided by the service provider.

However, an electronic file having a format that cannot be processed in the communication apparatus may be stored in the electronic file storing server that is provided by the service provider. Therefore, the electronic file having a format that cannot be processed in the communication apparatus may be downloaded to the communication apparatus.

There is a demand to provide a relay apparatus enabling a terminal to acquire contents of a predetermined format, irrespective of formats of contents to be transmitted from a server, a recording medium storing a program for a relay apparatus, an information processing method and an information processing system.

According to the aspect of the present disclosure, a relay apparatus configured to communicate with a server which transmits a content corresponding to identification information received by the server, and with a terminal which acquires the content corresponding to the identification information, comprises:

a communication unit configured to communicate with the server and the terminal; and
a processor configured to:
receive first identification information from the server through the communication unit;
determine whether a first content corresponding to the received first identification information complies with a first format or a second format;
transmit the first identification information to the terminal through the communication unit if the processor determines that the first content complies with the first format; and
transmits, to the terminal through the communication unit, second identification information corresponding to a second content which can be acquired by converting the first content if the processor determines that the first content complies with the second format.

According to the aspect of the present disclosure, a relay apparatus configured to communicate with a server which transmits a content corresponding to identification information received from the server, and with a terminal which acquires the content corresponding to the identification information, comprises:

a communication unit configured to communicate with the server and the terminal; and
a processor configured to:
receive a second identification information, which includes at least a first identification and type information indicative of a conversion type, through the communication unit;
acquire a first content corresponding to the first identification information from the server through the communication unit;
convert the acquired first content into a second content according to the type information included in the received second identification information, the first content complying with a format which is different from a form with which the second content complies;
transmit the converted second content to the terminal through the communication unit.

According to the aspect of the present disclosure, a non-transitory computer readable recording medium stores a program for controlling a relay apparatus configured to communicate with a server which transmits a content corresponding to identification information received from the server, and with a terminal which acquires the content corresponding to the identification information, the relay apparatus including a memory, a communication unit configured to communicate with the server and with the terminal and a processor being configured to execute the program, the program, when being executed by the processor, causing the relay apparatus to perform steps of:

receiving first identification information from the server through the communication unit;
determining whether a first content corresponding to the received first identification information complies with a first format or a second format;
transmitting the first identification information to the terminal through the communication unit if it is determined that the first content complies with the first format; and
transmitting, to the terminal through the communication unit, second identification information corresponding to second content which can be acquired by converting the first content if it is determined that the first content complies with the second format.

According to the aspect of the present disclosure, an information processing method for a relay apparatus configured to communicate with a server which transmits content corresponding to identification information received by the server, and a terminal which acquires the content corresponding to the identification information, the relay apparatus including a memory, a communication unit configured to communicate with the server and the terminal and a processor, comprises:

receiving first identification information from the server through the communication unit;

determining whether first content corresponding to the received first identification information complies with a first format or a second format;

transmitting the first identification information to the terminal through the communication unit if it is determined that the first content complies with the first format; and transmitting, to the terminal through the communication unit, second identification information corresponding to second content which is acquired by converting the first content if it is determined that the first content complies with the second format.

According to the aspect of the present disclosure, an information processing system comprises:

a terminal configured to acquire content corresponding to identification information;

a relay apparatus configured to communicate with a server which transmits content corresponding to identification information received by the server, and the terminal, wherein the relay apparatus includes:

a first communication unit configured to communicate with the server and the terminal; and a first processor configured to:

receive first identification information from the server through the first communication unit;

determine whether first content corresponding to the received first identification information complies with a first format or a second format;

transmit the first identification information to the terminal through the first communication unit if the first processor determines that the first content complies with the first format; and transmits, to the terminal through the first communication unit, second identification information corresponding to second content which is acquired by converting the first content if the first processor determines that the first content complies with the second format, and wherein the terminal includes:

a second communication unit configured to communicate with the server and the relay apparatus; and a second processor configured to:

receive the first identification information from the relay apparatus through the second communication unit;

receive the second identification information from the relay apparatus through the second communication unit;

acquire the first content corresponding to the first identification information from the server through the second communication unit; and acquire the second content corresponding to the second identification information from the server through the second communication unit.

BRIEF DESCRIPTION OF DRAWINGS

FIGS. 4A and 4B show examples of a file selection screen request, FIG. 4C is an example of a file list, FIG. 4D is an example of converted thumbnail specifying information and FIGS. 4E and 4F show examples of electronic file information.

FIG. 9A is a view pictorially showing a service cooperating system according to a modified embodiment, FIG. 9B is a view showing an example of thumbnail specifying information in the service cooperating system according to a modified embodiment and FIG. 9C is a view showing an example of converted thumbnail specifying information in the service cooperating system according to a modified embodiment.

FIG. 10 is a view showing an example of a file list in a service cooperating system according to a modified embodiment.

FIG. 11 is a flowchart showing relay processing that is executed in a relay apparatus according to a modified embodiment.

DESCRIPTION OF EXEMPLARY EMBODIMENTS

<Outline of Service Cooperating System 10>

Figure 1:
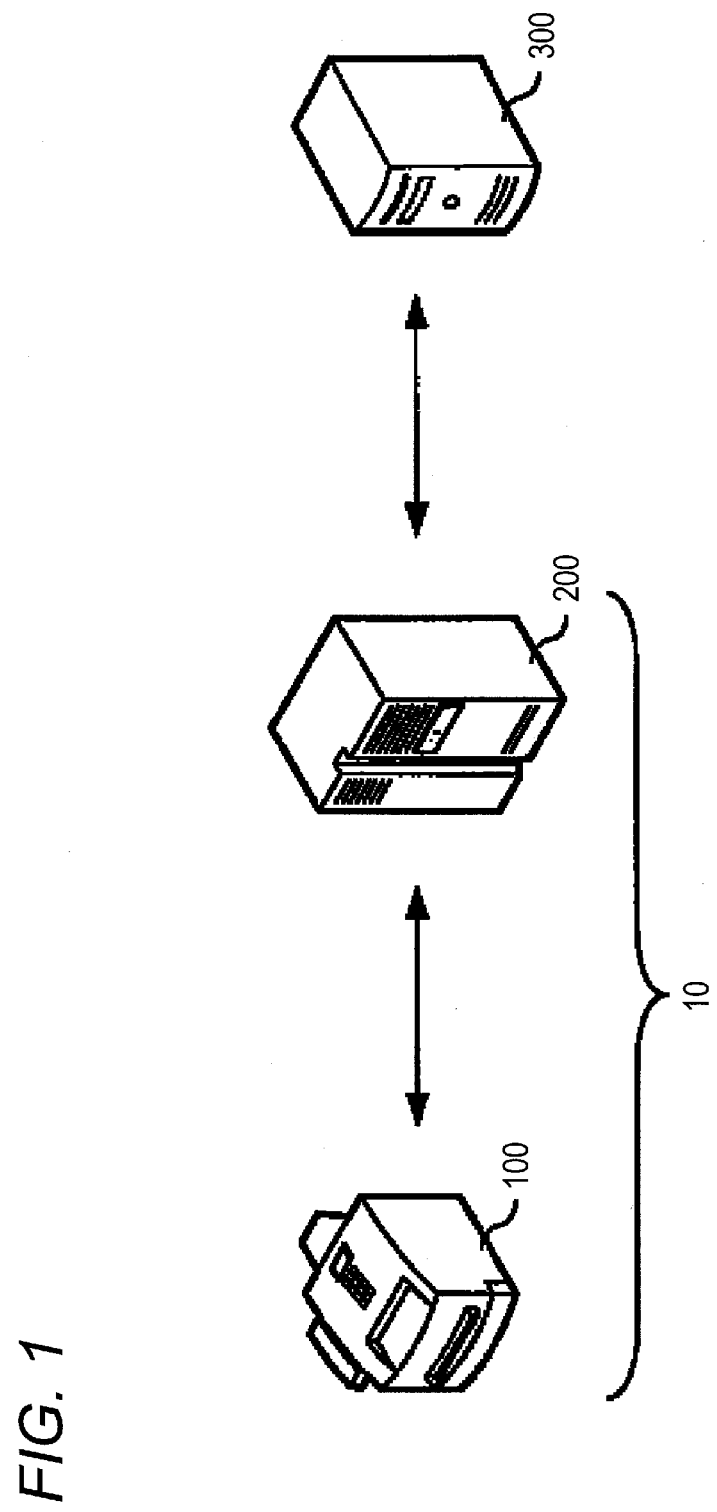
FIG. 1 is a schematic view of a service cooperating system including a relay apparatus according to an illustrative embodiment.

Hereinafter, exemplary embodiments will be described with reference to the accompanying drawings. As shown in FIG. 1, a service cooperating system 10 includes a multi function peripheral (hereinafter, referred to as 'MFP') 100 and a relay apparatus 200 and downloads an electronic file from an electronic file storing service that is provided by a service provider.

The MFP 100 is a digital complex machine having printing, scanner, FAX and copying functions. The relay apparatus 200 is a server that is established by a manufacturer of the MFP 100 and mounts program that is necessary to use an API released by the service provider. A service provision apparatus 300 is a well-known Web server that is established on the Internet by the service provider.

The relay apparatus 200 of this illustrative embodiment is configured to enable the MFP 100 to acquire contents of a format that can be processed by the MFP 100, irrespective of formats of contents to be transmitted from the service provision apparatus 300. In the below, the configuration is specifically described.

Here, the 'service provider' that is described in this illustrative embodiment provides a service of managing electronic files and releases an API for saving the electronic files in the service provision apparatus 300, an API for acquiring the electronic files managed by the service provision apparatus 300 and thumbnails of the electronic files, and the like. In the meantime, actually, there is a plurality of MPFs 100 using the service via the relay apparatus 200.

However, in the below, the illustrative embodiment is described, based on one MFP 100. In this illustrative embodiment, it is assumed that the relay apparatus 200 performs communication with the MFP 100 and communication with the service provision apparatus 300 in accordance with the http.

<Hardware Configuration of Service Cooperating System>

Figure 2:
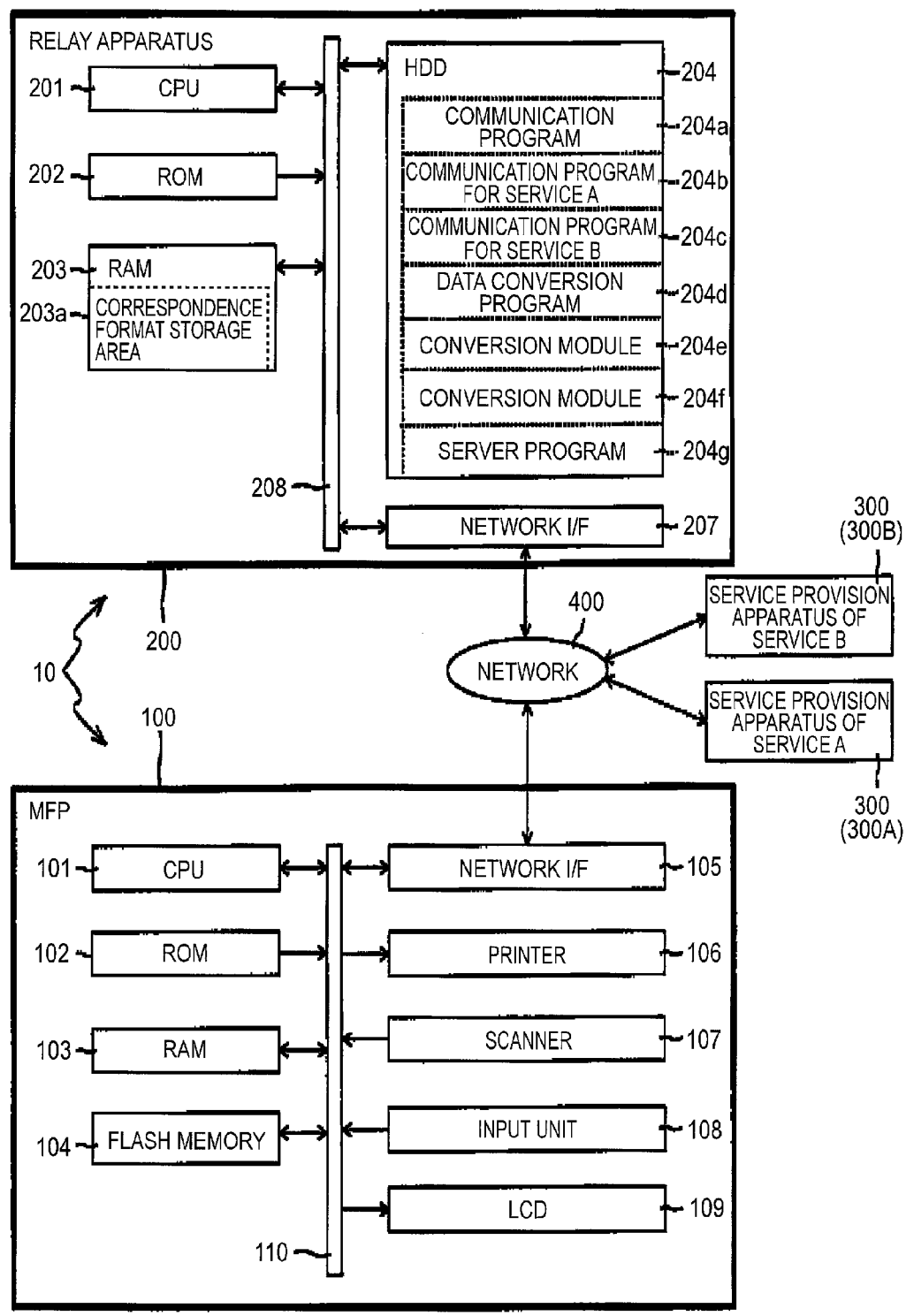
FIG. 2 is a block diagram schematically showing an electrical configuration of the service cooperating system.

As shown in FIG. 2, the service cooperating system 10 and the service provision apparatus 300 are connected through a network 400 and transmit and receive data each other. The network 400 is configured by an internet network, for example. In this illustrative embodiment, it is assumed that two service provision apparatuses 300 providing services of two types different from each other (service A, service B) exist on the network 400. In the below descriptions, when it is necessary to distinguish the two service provision apparatuses 300, an apparatus that provides the service A is referred to as a service provision apparatus 300A and an apparatus that provides the service B is referred to as a service provision apparatus 300B.

The MFP 100 mainly has a CPU 101, a ROM 102, a RAM 103, a flash memory 104, a network interface (I/F) 105, a printer 106, a scanner 107, an input unit 108 and a liquid crystal display apparatus (LCD) 109, which are connected to each other via a bus line 110.

The CPU 101 executes processing in accordance with programs that are stored in the ROM 102 and flash memory 104. The ROM 102 is a memory that stores program for controlling operations of the MFP 100, fixed values and the like. The RAM 103 temporarily stores information that is necessary for the processing of the CPU 101. The flash memory 104 is an updatable non-volatile memory and stores parameters for communication, phonebook data and the like. In the meantime, the flash memory 104 also stores the other programs such as rendering driver for preparing a screen, based on a text described with a markup language such as XML, and the like, which are not shown and described.

The network I/F 105 is a device for performing communication with the other apparatuses via the network 400 and the well-known network hardware may be adopted. The printer 106 is an apparatus that prints an image. The MFP 100 develops (processes) an image file of a JPEG format (hereinafter, referred to as 'JPEG file') and prints an image corresponding to the JPEG file by the printer 106. The scanner 107 is an apparatus that reads out an image. The input unit 108 includes a touch panel for inputting an instruction or information to the MFP 100 and is arranged to overlap with a display surface of the LCD 109. The MFP 100 develops the JPEG file input through the network I/F 105 and displays the image corresponding to the JPEG file on the LCD 109.

The relay apparatus 200 is an apparatus having the well-known Web server functions and mainly has a CPU 201, a ROM 202, a RAM 203, a hard disk drive (HDD) 204 and a network I/F 207, which are connected to each other via a bus line 208.

The CPU 201 executes processing in accordance with programs stored in the ROM 202 or HDD 204. The ROM 202 stores therein programs for controlling the relay apparatus 200, and the like. The RAM 203 temporarily stores data that is necessary for the processing of the CPU 201. A correspondence format storage area 203a that will be described later is an area that is provided in the RAM 203.

The HDD 204 stores therein communication program 204a, communication program 204b for service A, communication program 204c for service B, data conversion program 204d, conversion modules 204e, 204f and server program 204g. The communication program 204a is program for relaying the communication between the MFP 100 and the service provision apparatus 300.

The communication program 204b for service A and the communication program 204b for service B are programs for performing communication with the service provision apparatus 300, respectively. An HTTP message using the API provided by the service A is prepared in accordance with the communication program 204b for service A. An HTTP message using the API provided by the service B is prepared in accordance with the communication program 204c for service B. The data conversion program 204d is program for converting an electronic file, which is downloaded from the service provision apparatus 300, into data of a format that can be used in the MFP 100, together with the conversion module 204e or 204f. The server program 204g is program for providing basic functions that are commonly used in most of programs such as relay of transmission and reception of values between a plurality of programs and memory management. The network I/F 207 is a device for performing communication with the other apparatuses connected to the network 400.

<Operations of Service Cooperating System 10>

Figure 3:
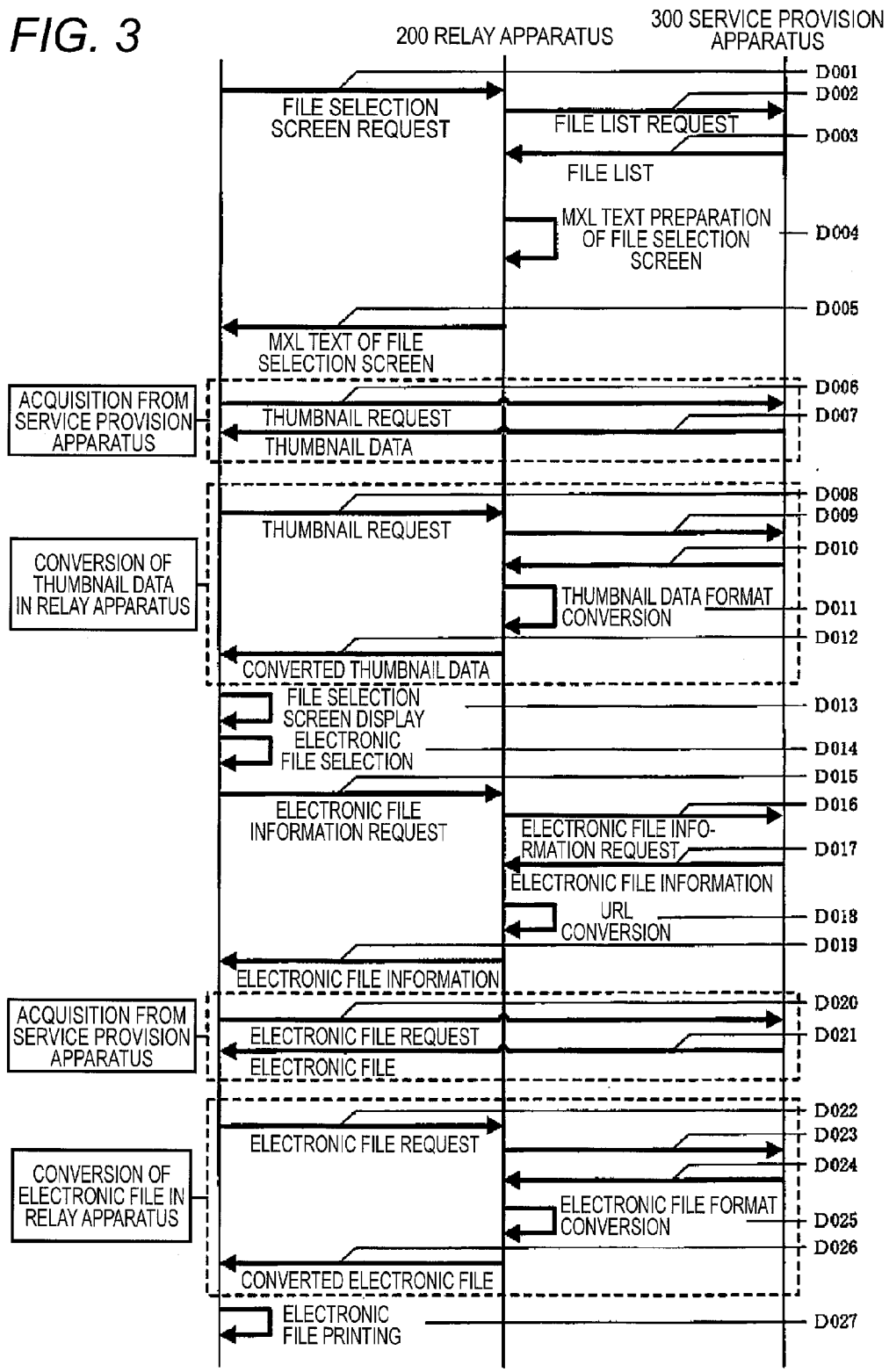
FIG. 3 is a sequence view showing a flow of information among an MFP, a relay apparatus and a service provision apparatus.

An example of the operation of the service cooperating system 10 is described with reference to FIG. 3. The example of FIG. 3 shows a flow of data when a user of the MFP 100 downloads an electronic file from the service and selects a printing of the electronic file.

First, when the user operates the input unit 108 of the MFP 100 to select a service for downloading an electronic file, the MFP 100 transmits a file selection screen request to the relay apparatus 200 (D001). The file selection screen request is an HTTP message and contains format information indicating a format of data (which can be displayed and printed) that can be processed by the MFP 100.

The file selection screen request shown in FIG. 4A includes service specifying information 401 that is information for specifying the service selected by the user, relay apparatus specifying information 402 that designates the relay apparatus 200 and first type format information 404 that designates a format of contents that can be processed by the MFP 100 (which is a source of the request). The first type format information 404 shown in FIG. 4A indicates that a JPEG format and a TIFF format are available for the MFP 100 of a transmission source of the file selection screen request.

In the meantime, the file selection screen request shown in FIG. 4B includes the service specifying information 401, the relay apparatus specifying information 402 and second type format information 406 indicating a model name (type) of the MFP 100 that is a source of the request. The second type format information 406 shown in FIG. 4B indicates that the model name and a firmware version of the MFP 100, which is the transmission source of the file selection screen request, are B/MFC-999 and 1.0, respectively.

Each terminal (including the MFP 100) that uses the service through the relay apparatus 200 transmits the file selection screen request including one of the first type format information 404 and the second type format information 406 or both of them to the relay apparatus 200. In the meantime, when the relay apparatus 200 receives the first type format information 404, the relay apparatus stores a format designated by the first type format information 404 in the correspondence format storage area 203a, as 'correspondence format.' When the relay apparatus receives the second type format information 406, the relay apparatus refers to a correspondence database, which is beforehand stored in the HDD 204 and indicates a correspondence relation between a type of each terminal and a format of contents that can be processed by the terminal of the corresponding type, and stores a format of contents that can be processed by a terminal having a model name indicated by the second type format information 406 in the correspondence format storage area 203*a*, as a correspondence format. In the below, the format that is stored in the correspondence format storage area 203*a* is simply referred to as the correspondence format of the MFP 100.

Turning to FIG. 3, when the relay apparatus 200 receives the file selection screen request, the relay apparatus transmits a file list request to the service provision apparatus 300 of the service (which is selected by the user) (D002). Here, since the API for acquiring the file list from the service is different for each of the services, the relay apparatus 200 prepares the file list request in accordance with the program corresponding to the service designated by the user. Specifically, when the user designates the service A, the relay apparatus 200 prepares the file list request using the API, which is released by the service A, in accordance with the communication program 204*b* for service A stored in the HDD 204 and transmits the same to the service provision apparatus 300A. In the meantime, the service provision apparatus 300 having received the file list request sends back a file list to the relay apparatus (D003).

FIG. 4C shows an example of the file list. As shown in FIG. 4C, the file list is information consisting of a text and includes a plurality of individual file information 407. The one individual file information 407 corresponds to one electronic file that is managed by the service provision apparatus 300. Each of the individual file information 407 includes thumbnail specifying information 408 and file specifying information 410.

The thumbnail specifying information 408 is information for specifying thumbnail data that is reduced image data of the electronic file, and includes, as attribute values, type information 408*a* and thumbnail URL (Uniform Resource Locator) 408*b*. The type information 408*a* indicates a format of the thumbnail data. The thumbnail URL 408*b* is a URL that designates the service provision apparatus 300 as a transmission destination, and is information indicating a location of the thumbnail data. By transmitting a request based on the thumbnail URL 408*b* included in the file list to the service provision apparatus 300, it is possible to acquire the thumbnail data having a format indicated by the type information 408*a* from the service provision apparatus 300. The file specifying information 410 is information that indicates a contents ID allotted to each electronic file in the service provision apparatus 300.

Here, when the format of the thumbnail data provided by the service provision apparatus 300 is different from the correspondence format of the MFP 100, the MFP 100 that is a source of the file list request cannot process the thumbnail data even though the MFP has acquired the thumbnail data. Accordingly, the relay apparatus 200 of this illustrative embodiment checks up, for each of the thumbnail specifying information 408 included in the file list received from the service provision apparatus 300, the format of the corresponding thumbnail data. Specifically, the relay apparatus acquires a format of the thumbnail data, based on the type information 408*a* included in the thumbnail specifying information 408 or extension included in the thumbnail URL 408*b*. When it is determined that a format of the thumbnail data is the correspondence format (for example, when it is determined that a format of the thumbnail data is a JPEG format), the relay apparatus does not change the thumbnail specifying information 408. On the other hand, when it is determined that a format of the thumbnail data is a non-correspondence format (for example, when it is determined that a format of the thumbnail data is a PNG format), the relay apparatus changes the thumbnail specifying information 408 into converted thumbnail specifying information.

As shown in FIG. 4D, the converted thumbnail specifying information 412 includes type information 412*a* and converted thumbnail URL 412*b*. The type information 412*a* is information that indicates a format of the converted thumbnail data (which will be described later), and indicates the correspondence format. The converted thumbnail URL 412*b* is a URL that is used so as to acquire the converted thumbnail data (which will be described later). The converted thumbnail URL 412*b* includes a server name 413*a* that designates the relay apparatus 200 as a transmission destination, module information 413*b* indicating a conversion module that should be used to create converted thumbnail data in the relay apparatus 200 and an org parameter 413*c* that designates the thumbnail URL 408*b*, which will be described later.

Returning to FIG. 3, in D004, when the relay apparatus 200 extracts the thumbnail specifying information 408, the relay apparatus records the thumbnail specifying information 408 corresponding to the thumbnail data having the correspondence format in an XML text, as it is, and for the thumbnail specifying information 408 corresponding to the thumbnail data having the non-correspondence format, changes the same into the converted thumbnail specifying information 412 and records it in an MXL text (D004). Then, the relay apparatus 200 transmits a message including the MXL text prepared in D004 to the MFP 100 (D005).

In the meantime, when the MFP 100 receives the MXL text of the file selection screen, the MFP extracts the thumbnail URL 408*b* and converted thumbnail URL 412*b* included in the XML text and prepares a thumbnail request. The thumbnail request is an HTTP message using a GET method and includes a URL of thumbnail data that the MFP desires to acquire. Here, the MXL text of the file selection screen includes three patterns, i.e., a pattern in which both the thumbnail URL 408*b* and the converted thumbnail URL 412*b* are included, a pattern in which only the thumbnail URL 408*b* is included and a pattern in which only the converted thumbnail URL 412*b* is included. The MFP 100 prepares one thumbnail request for one URL and transmits the same to the network 400, sequentially, without distinguishing whether each URL is the thumbnail URL 408*b* or converted thumbnail URL 412*b*.

First, a case where the MFP 100 prepares the thumbnail request including the thumbnail URL 408*b* is described. As described above, the thumbnail URL 408*b* is a URL that designates the service provision apparatus 300 as a transmission destination. Therefore, the thumbnail request transmitted to the network 400 from the MFP 100 is transmitted to the service provision apparatus 300 (D006).

In the meantime, when the service provision apparatus 300 receives the thumbnail request from the network 400, the service provision apparatus transmits the thumbnail data, which corresponds to the thumbnail URL 408*b* included in the thumbnail request, to the MFP 100 that is the transmission source of the thumbnail URL 408*b* (D007). Therefore, the MFP 100 can acquire the thumbnail data corresponding to the thumbnail URL 408*b* through the network 400.

Here, a server that performs communication based on the HTTP typically supports the GET method. Hence, the MFP 100 can execute the GET method, based on the thumbnail URL 408b and converted thumbnail URL 412b included in the MXL text, and thus download the thumbnail data from each service, even though the MFP does not have a processing capability capable of using the API of each service.

In the below, a case where the MFP prepares the thumbnail request including the converted thumbnail URL 412b is described. As described above, the converted thumbnail URL 412b is a URL that designates the relay apparatus 200 as a transmission destination. Accordingly, the thumbnail request transmitted to the network 400 from the MFP 100 is transmitted to the relay apparatus 200 (D008).

In the meantime, the relay apparatus 200 acquires the converted thumbnail data, based on the converted thumbnail URL 412b included in the received thumbnail request. Specifically, the relay apparatus extracts the thumbnail URL 408b included in the converted thumbnail URL 412b and transmits the thumbnail request including the thumbnail URL 408b to the service provision apparatus 300 (D009), thereby acquiring the thumbnail data corresponding to the thumbnail URL 408b from the service provision apparatus 300 (D010). Then, the relay apparatus converts a format of the acquired thumbnail data to create converted thumbnail data having the correspondence format (D011) and transmits the created thumbnail data to the MFP 100 that is a source of the thumbnail request (D012).

Like this, the MFP 100 having received the thumbnail data from the service provision apparatus 300 or relay apparatus 200 displays the electronic file selection screen on the LCD 109 and arranges thumbnails, which are drawn based on the received thumbnail data, on the electronic file selection screen (D013). Accordingly, the user can find out a desired electronic file while reading the thumbnails and operate the input unit 108 to designate the thumbnail of the desired electronic file.

When the MFP 100 receives the selection of the electronic file by the user (D014), the MFP transmits an electronic file information acquisition request to the relay apparatus 200 (D015). The electronic file information acquisition request includes the file specifying information 410 of the selected electronic file. The request includes one of the first type format information 404 (FIG. 4A) and the second type format information 406 (FIG. 4B). Since the first type format information 404 and the second type format information 406 have been described with reference to FIGS. 4A and 4B, the further descriptions are omitted. The relay apparatus 200 stores the format (correspondence format), which can be processed in the MFP 100 that is the request source of the electronic file URL, in the correspondence format storage area 203a, based on any one of the format information 404, 406 included in the electronic file information acquisition request.

Then, the relay apparatus 200 transmits the electronic file information acquisition request to the service provision apparatus 300 of the service that is specified by the service specifying information 401 (D016). The electronic file information acquisition request includes the file specifying information 410 received from the MFP 100. In the meantime, the relay apparatus 200 prepares the electronic file information acquisition request in accordance with the program corresponding to the service.

In the meantime, the service provision apparatus 300 having received the electronic file information acquisition request transmits the electronic file information including the URL of the electronic file, which corresponds to the file specifying information 410 included in the electronic file information acquisition request, to the relay apparatus 200 (D017). FIG. 4E shows an example of the file information that is transmitted to the relay apparatus 200 in D017. The electronic file information 414 includes at least the electronic file URL 414b. The electronic file URL 414b is a URL that designates the service provision apparatus 300 as a transmission destination. Here, the relay apparatus 200 acquires a format of the electronic file, based on the extension of the electronic file URL 414b.

In the meantime, when the electronic file information 414 received from the service provision apparatus 300 includes type information 414a indicating the format of the electronic file, the relay apparatus may acquire the format of the electronic file, based on the type information.

When it is determined that the electronic file corresponding to the electronic file URL 414b is the correspondence format of the MFP 100, the relay apparatus 200 transmits the electronic file information 414 to the MFP 100, as it is. On the other hand, when the electronic file corresponding to the electronic file URL 414b is not the correspondence format of the MFP 100, the relay apparatus 200 changes the electronic file URL 414b included in the electronic file information 414 into a converted electronic file URL 415b (D018). Then, the relay apparatus transmits the electronic file information 414 including the converted electronic file URL 415b to the MFP 100 (D019). As shown in FIG. 4F, the converted electronic file URL 415b includes a server name 413a that designates the relay apparatus 200 as a transmission destination, module information 413b and an org parameter 415c that designates the electronic file URL 414b before the change (i.e., the original URL).

When the MFP 100 receives the electronic file URL 414b from the relay apparatus 200, the MFP 100 prepares and transmits an electronic file request to the network 400. Here, the electronic file request is an HTTP message using the GET method and includes the electronic file URL 414b received from the relay apparatus 200. Since the electronic file URL 414b is a URL that designates the service provision apparatus 300 as a transmission destination, the electronic file request transmitted from the MFP 100 to the network 400 is transmitted to the service provision apparatus 300 (D020).

In the meantime, the service provision apparatus 300 transmits an electronic file, which corresponds to the electronic file URL 414b included in the received electronic file request, to the MFP 100 (D021). The electronic file is data having the correspondence format that can be processed in the MFP 100. Therefore, the MFP 100 can print the electronic file received from the service provision apparatus 300 by the printer 106 (D027).

In the below, a case where the converted electronic file URL 415b is received from the relay apparatus 200 is described. In this case, the MFP 100 prepares and transmits an electronic file request including the converted electronic file URL 415b to the network 400. As described above, the converted electronic file URL 415b is a URL that designates the relay apparatus 200 as a transmission destination. Therefore, the electronic file request transmitted from the MFP 100 to the network 400 is transmitted to the replay apparatus 200 (D022).

In the meantime, the relay apparatus 200 creates a conversion electronic file, based on the converted electronic file URL 415b included in the received electronic file request. Specifically, the relay apparatus extracts the electronic file URL 414b (i.e., the original electronic file URL) included in the converted electronic file URL 415b, transmits the electronic file request including the electronic file URL 414b to the service provision apparatus 300 (D023) and acquires an electronic file corresponding to the electronic file URL 414b from the service provision apparatus 300 (D024). Then, the relay apparatus converts the format of the acquired electronic file into the correspondence format of the MFP 100 to create a converted electronic file having the correspondence format of the MFP 100 (D025) and transmits the same to the MFP 100 that is a source of the electronic file request (D026). The electronic file is data having the correspondence format that can be processed in the MFP 100. Accordingly, the MFP 100 having received the conversion electronic file from the service provision apparatus 300 can print the received converted electronic file by the printer 106 (D027).

According to the relay apparatus 200 of this illustrative embodiment, even the MFP 100, which does not include the program for using the API released by the service provision apparatus 300, can acquire the thumbnail data or electronic file that is provided by the service provision apparatus 300.

When the format of the contents (thumbnail data, electronic file) transmitted from the service provision apparatus 300 is the correspondence format of the MFP 100, the relay apparatus 200 transmits the thumbnail URL 408b or electronic file URL 414b to the MFP 100, as it is. In this case, the MFP 100 can receive the data from the service provision apparatus 300 without through the relay apparatus 200. Therefore, it is possible to suppress an amount of data via the relay apparatus 200 and to thus suppress the load that is generated in the relay apparatus 200.

When the format of the contents transmitted from the service provision apparatus 300 is not the correspondence format of the MFP 100, the relay apparatus 200 transmits the converted thumbnail URL 412b corresponding to the converted contents or converted electronic file URL 415b to the MFP 100. In this case, the MFP 100 can acquire the converted contents having the correspondence format of the MFP 100. Thus, it is possible to enable the MFP 100 to acquire the contents having the correspondence format of the MFP 100, irrespective of the formats of the contents transmitted from the service provision apparatus 300.

The relay apparatus 200 acquires the format of the contents that are provided by the service provision apparatus 300, based on the thumbnail specifying information 408 or electronic file information 414. Therefore, it is not necessary for the relay apparatus 200 to beforehand recognize the types of the contents that are transmitted by the service provision apparatus 300. Hence, even when the contents are changed into a format of an electronic file that is handled by the service provision apparatus 300, it is possible to flexibly cope with the change.

Even when the service provision apparatus 300 changes the API, a provider who provides the MFP 100 to the user can enable the MFP 100 to keep the cooperation with the respective services, simply by updating the program of using the API of the relay apparatus 200.

The relay apparatus 200 can acquire the format that can be processed by the MFP 100, based on any one of the format information 404, 406 received from the MFP 100. Thus, even when the various MFPs 100 use the relay apparatus 200, it is possible to enable the respective MFPs 100 to acquire the contents having a format that can be processed in the MFPs 100.

<Operations of Relay Apparatus 200>

Figure 5:
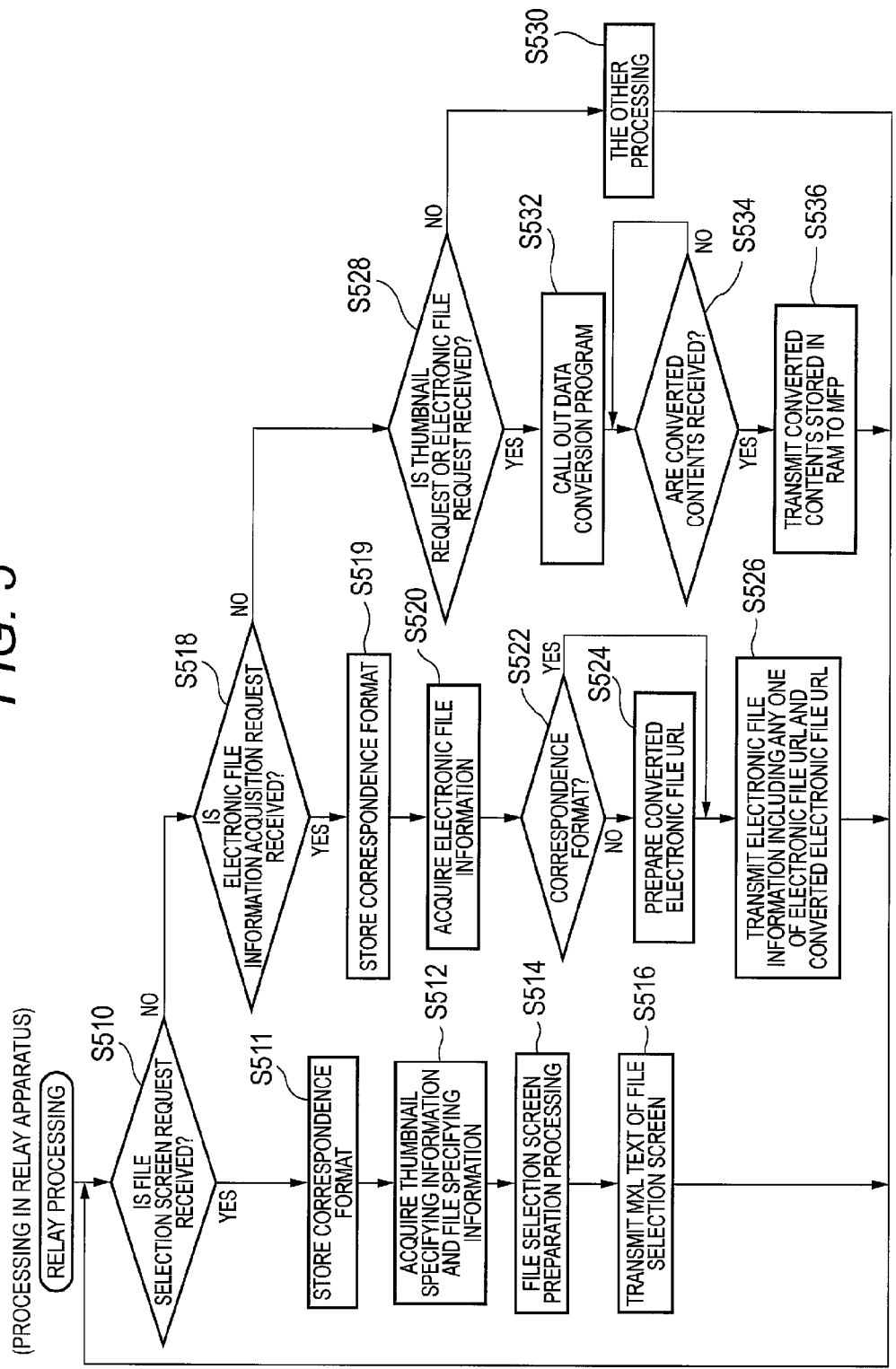
FIG. 5 is a flowchart showing relay processing that is executed in the relay apparatus.

FIG. 5 is a flowchart showing relay processing that the CPU 201 of the relay apparatus 200 executes in accordance with the communication program 204a. The relay processing is repeatedly executed during the operation of the relay apparatus 200.

First, the CPU 201 determines whether the file selection screen request is received from the MFP 100 through the network I/F 207 (S510). When the file selection screen request is received from the MFP 100 (S510: Yes), the CPU proceeds to S511. In S511, the CPU 201 reads out the first type format information 404 or second type format information 406 from the file selection screen request received in S510. When the read information is the first type format information 404, the CPU 201 stores the first type format information 404 in the correspondence format storage area 203a. On the other hand, when the read information is the second type format information 406, the CPU 201 reads out the format of contents that a terminal of a model name indicated by the second type format information 406 can process from the correspondence database and stores the read format of contents in the correspondence format storage area 203a (S511).

Then, the CPU 201 controls the network I/F 207 to transmit the file list request to the service provision apparatus 300. The CPU 201 stores the file list (refer to FIG. 4C), which is received through the network I/F 207 as a reply from the service provision apparatus 300, in the RAM 203. As described above with reference to FIG. 4C, the file list includes the thumbnail specifying information 408 and the file specifying information 410 (S512). Then, the CPU 201 executes file selection screen preparation processing (S514).

Figure 6:
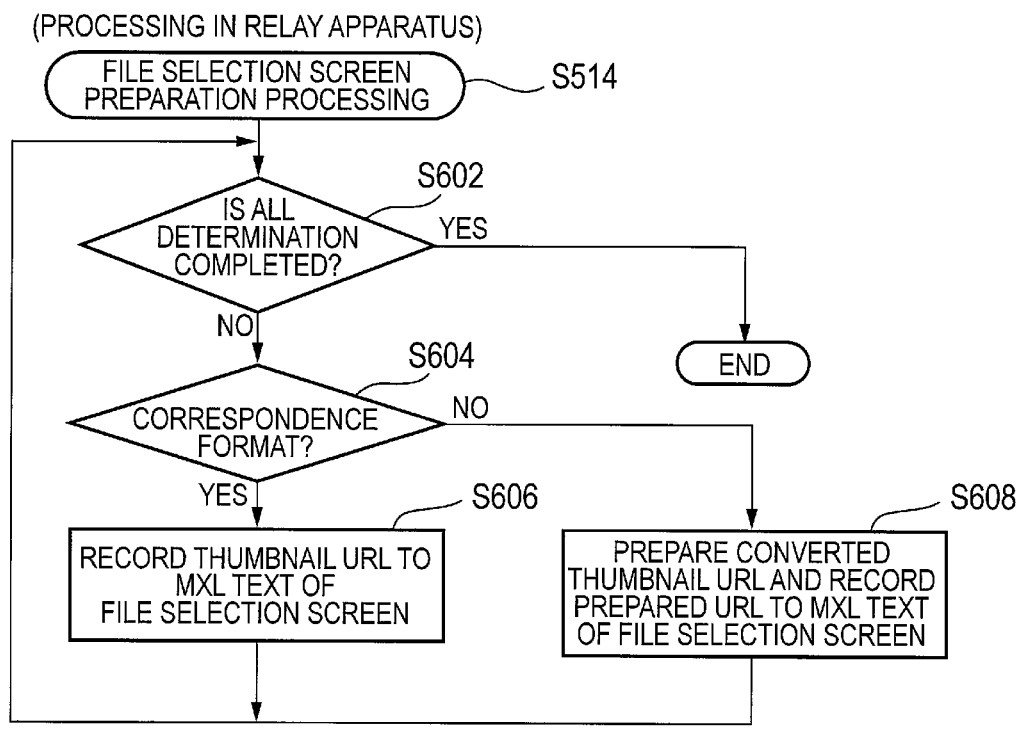
FIG. 6 is a flowchart showing file selection screen preparation processing that is executed in the relay apparatus.

FIG. 6 is a flowchart showing the file selection screen preparation processing (S514). This processing is processing of preparing an XML text of the file selection screen by using the thumbnail specifying information 408 and the file specifying information 410.

First, the CPU 201 determines whether the determination is made for all the thumbnail specifying information 408 included in the file list stored in the RAM 203 (S602). When a result of the determination in S602 is negative (S602: No), the CPU 201 determines whether the thumbnail data corresponding to the thumbnail specifying information 408, which is a determination object, is the correspondence format stored in the correspondence format storage area 203a, based on the type information 408a or thumbnail URL 408b included in the thumbnail specifying information 408 (S604).

When it is determined that the thumbnail data corresponding to the thumbnail specifying information 408, which is a determination object, is the correspondence format (S604: Yes), the CPU 201 records the thumbnail specifying information 408 in the MXL text of the file selection screen, as it is (S606). That is, the CPU records the thumbnail URL 408b in the MXL text and returns to S602.

On the other hand, when it is determined that the thumbnail data corresponding to the thumbnail specifying information 408, which is a determination object, is the non-correspondence format (S604: No), the CPU 201 prepares the converted thumbnail specifying information 412 and records the same in the MXL text of the file selection screen (S608). As described above with reference to FIG. 4D, the converted thumbnail specifying information 412 that is prepared at this time includes the server name 413a, the module information 413b and the org parameter 413c in the converted thumbnail URL 412b. Here, when transmitting a request based on the converted thumbnail URL 412b, the relay apparatus 200 is designated in the server name 413a that designates a reception source of the request. A conversion module for converting a format of the thumbnail data, which is transmitted by the service provision apparatus 300, into the correspondence format is designated in the module information 413b. The original thumbnail URL 408b included in the thumbnail specifying information 408 is designated in the org parameter 413c.

Then, the CPU returns to S602, repeats the processing for next thumbnail specifying information 408 that is a determination object and ends the file selection screen preparation processing when the determination is completed for all the thumbnail specifying information 408 (S602: Yes).

Again referring to FIG. 5, the CPU 201 controls the network I/F 207 to transmit the MXL text of the file selection screen to the MFP 100 (S516) and returns to S510.

On the other hand, when the file selection screen request is not received (S510: No), the CPU 201 determines whether the electronic file information acquisition request is received from the MFP 100 through the network I/F 207 (S518). In the meantime, as described above, the electronic file information acquisition request includes one of the format information 404, 406 indicating the format that can be processed in the MFP 100. Therefore, when it is determined that the electronic file information acquisition request is received from the MFP 100 (S518: Yes), the CPU 201 stores the format that can be processed in the MFP 100 in the correspondence format storage area 203a, based on one of the format information 404, 406 (S519).

Then, the CPU 201 controls the network I/F 207 to transmit the electronic file information acquisition request corresponding to the file specifying information 410 to the service provision apparatus 300. The CPU 201 stores the electronic file information 414, which is received through the network I/F 207 as a reply from the service provision apparatus 300 and includes at least the electronic file URL 414b, in the RAM 203 (S520). Then, the CPU determines whether the format of the electronic file corresponding to the electronic file URL 414b, which is included in the electronic file information 414 stored in the RAM 203, is the correspondence format of the MFP 100, based on the extension of the electronic file included in the electronic file URL 414b or type information 414a (S522). When it is not determined that the electronic file corresponding to the electronic file URL 414b is the correspondence format of the MFP 100 (S522: No), the CPU 201 prepares the converted electronic file URL 415b (S524). Then, the CPU transmits the electronic file information 414 including at least the converted electronic file URL 415b to the MFP 100 that is a source of the electronic file information acquisition request (S526) and returns to S510. On the other hand, when it is determined that the format of the electronic file corresponding to the electronic file URL 414b is the correspondence format of the MFP 100 (S522: Yes), the CPU 201 transmits the electronic file information 414 including the electronic file URL 414b to the MFP 100 that is a source of the electronic file information acquisition request (S526) and returns to S510.

On the other hand, when it is determined in S518 that the electronic file information acquisition request is not received (S518: No), the CPU 201 determines whether the thumbnail request or electronic file request based on the converted thumbnail URL 412b or converted electronic file URL 415b (hereinafter, the converted thumbnail URL 412b and the converted electronic file URL 415b are collectively referred to as converted URL) is received (S528). When a result of the determination in S528 is negative (S528: No), the CPU 201 executes the other processing (S530) and returns to S510. The other processing may include processing of relaying the communication between the MFP 100 and the service provision apparatus 300 when the MFP 100 uploads a desired electronic file.

When the thumbnail request or electronic file request is received (S528: Yes), the CPU 201 calls out the data conversion program 204d (S532). Then, the CPU determines whether the converted contents are received, as a reply value, from the data conversion program 204d (S534). When it is determined that the converted contents are not received (S534: No), the CPU repeats the corresponding determination. When it is determined that the converted contents are received (S534: Yes), the CPU proceeds to S536.

Image acquisition/conversion processing is described with reference to FIGS. 7A and 7B. This processing is executed in accordance with the data conversion program 204d called out in S532 and the png2jpg module 203e or bmp2jpg module 204f called out in the data conversion program 204d. In this illustrative embodiment, a conversion module that converts data of a PNG format into data of a JPEG format is referred to as the png2jpg module 204e and a conversion module that converts data of a BMP format into data of a JPEG format is referred to as the bmp2jpg module 204f. In the meantime, conversion modules handling the other formats may be further provided, in addition to the conversion modules 204e, 204f.

First, the CPU 201 analyzes the converted URL included in the thumbnail request or electronic file request and thus extracts the module information 413b (refer to FIG. 4D) (S702). Then, the CPU 201 starts up a conversion module of the conversion modules 204e, 204f, which is designated by the module information 413b, as the conversion module for converting the format of the thumbnail data or electronic file provided by the service provision apparatus 300 into the correspondence format (S704). In the meantime, for convenience sake of explanations, it is assumed that the conversion module 204e starts up. Processing that is executed in accordance with the conversion module 204e is described later with reference to FIG. 7B.

Then, the CPU 201 determines whether the request for org parameters 413c, 415c is received from the conversion module 204e having started up (S706). When a result of the determination in S706 is negative (S706: No), the CPU 201 stands by for the processing. On the other hand, when a result of the determination in S706 is positive (S706: Yes), the CPU 201 transmits the org parameters 413c, 415c included in the converted URL to the conversion module 204e (S708). Then, the CPU determines whether the converted thumbnail data or conversion electronic file (hereinafter, referred to as converted contents) is received from the conversion module 204e (S710). When a result of the determination in S710 is negative (S710: No), the CPU 201 stands by for the processing. On the other hand, when a result of the determination in S710 is positive (S710: Yes), the CPU 201 returns, as a return value, the converted contents received from the conversion module 204e to the communication program 204a that is a startup source of the data conversion program 204d and ends the processing (S712).

Figure 7:
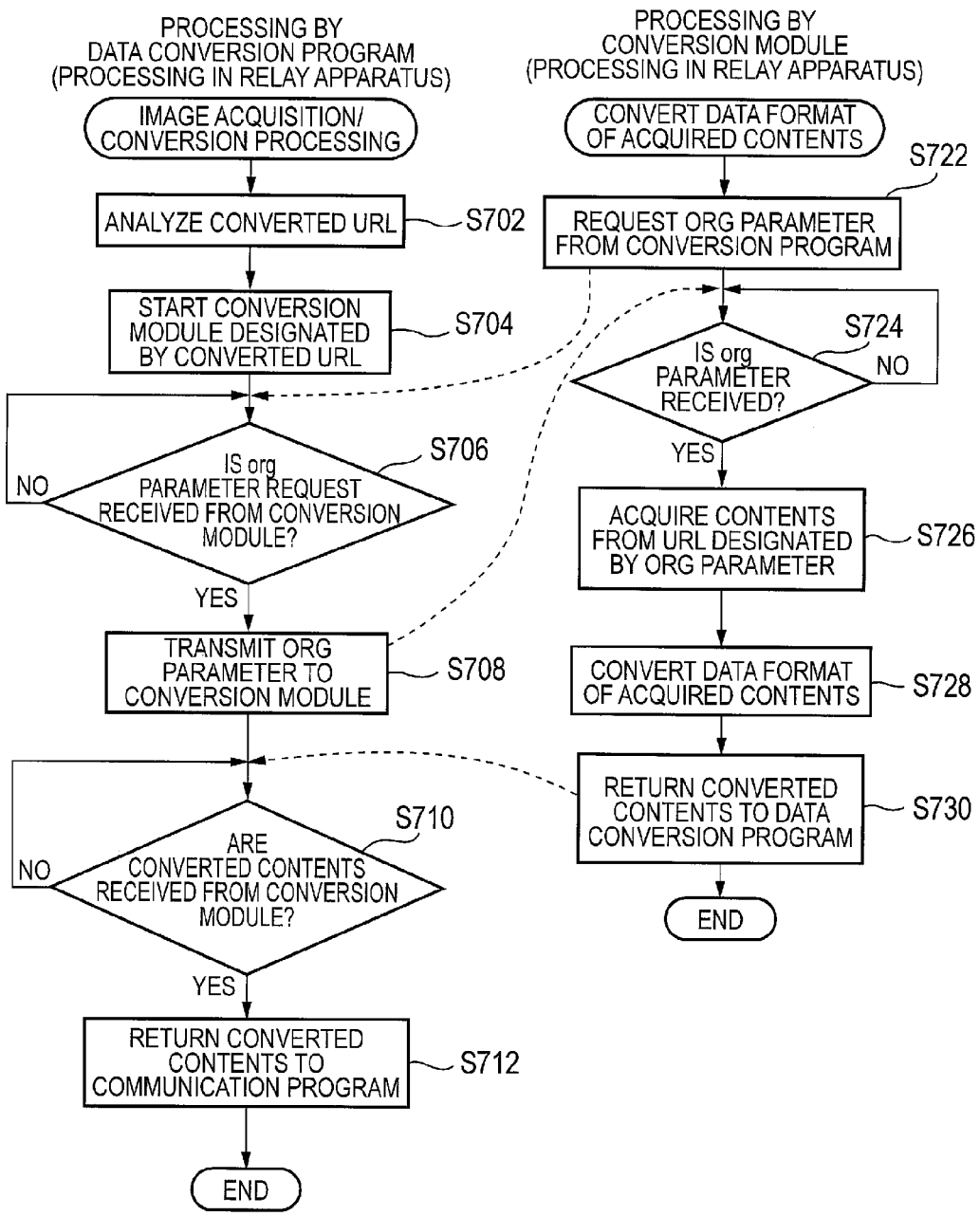
FIG. 7A is a flowchart showing image acquisition/conversion processing that is executed in the relay apparatus and FIG. 7B is a flowchart showing conversion execution processing that is executed in the relay apparatus.

FIG. 7B is a flowchart showing conversion execution processing that is executed in accordance with the conversion module 204e having started up, as it is called out in the data conversion program 204d (S704). In the meantime, the CPU 201 executes this processing in parallel with the image acquisition/conversion processing by multi-tasking.

First, the CPU 201 requests the org parameters 413c, 415c from the data conversion program 204d (S722). Then, the CPU determines whether the org parameters 413c, 415c are received from the data conversion program 204d (S724). When a result of the determination in S724 is negative (S724: No), the CPU stands by for the processing.

On the other hand, when a result of the determination in S724 is positive (S724: Yes), the CPU 201 controls the network I/F 207 to transmit the HTTP message using the GET method, which includes the URL (original thumbnail URL 408*b* or electronic file URL 414*b*) designated by the org parameters 413*c*, 415*c*, to the network 400. When a reply to the HTTP message is received from the service provision apparatus 300 to the network I/F 207, the CPU reads out the contents that are included in the received reply (S726).

Then, the CPU 201 converts the data format of the read contents (S728). The CPU 201 converts the contents of the PNG format into the JPEG format. Since the conversion method is well-known, the detailed descriptions thereof are omitted.

Then, the CPU 201 returns the created converted contents to the data conversion program 204*d* (S730) and ends the conversion execution processing of the conversion module 204*e*.

Returning to FIG. 5, in S536, the CPU 201 controls the network I/F 207 to transmit the converted contents, which are received from the data conversion program 204*d* as a return value, to the MFP 100 (S536). Then, the CPU returns to S510.

According to the image acquisition/conversion processing, it is possible to create and to transmit the contents of the correspondence format to the MFP 100. Meanwhile, instead of the method of the above illustrative embodiment, a method may be considered in which the correspondence formats of the respective MFPs 100 are stored in the database and when the contents request (thumbnail data request or electronic file request) is received from the MFP 100, the correspondence format of the MFP 100 is read out from the database and the converted contents are then created. However, according to this method, when the accesses from the MFPs 100 are concentrated, the correspondence formats should be read out for each of the MFPs 100, so that the processing in the relay apparatus 200 may be delayed. Contrary to this, according to the image acquisition/conversion processing of this illustrative embodiment, since the converted URL included in the contents request contains the module information 413*b*, the relay apparatus 200 can rapidly create the converted contents of a format that can be processed in the MFP 100, which is the source of the contents request, by using the conversion modules 204*e*, 204*f* designated by the module information 413*b*.

It is possible to cope with more formats by increasing the formats that can be converted in the relay apparatus 200. Therefore, it is possible to ostensibly increase the contents that can be used in the MFP 100, without changing the program or firmware of the MFP 100.

<Operations of MFP 100>

Figure 8:
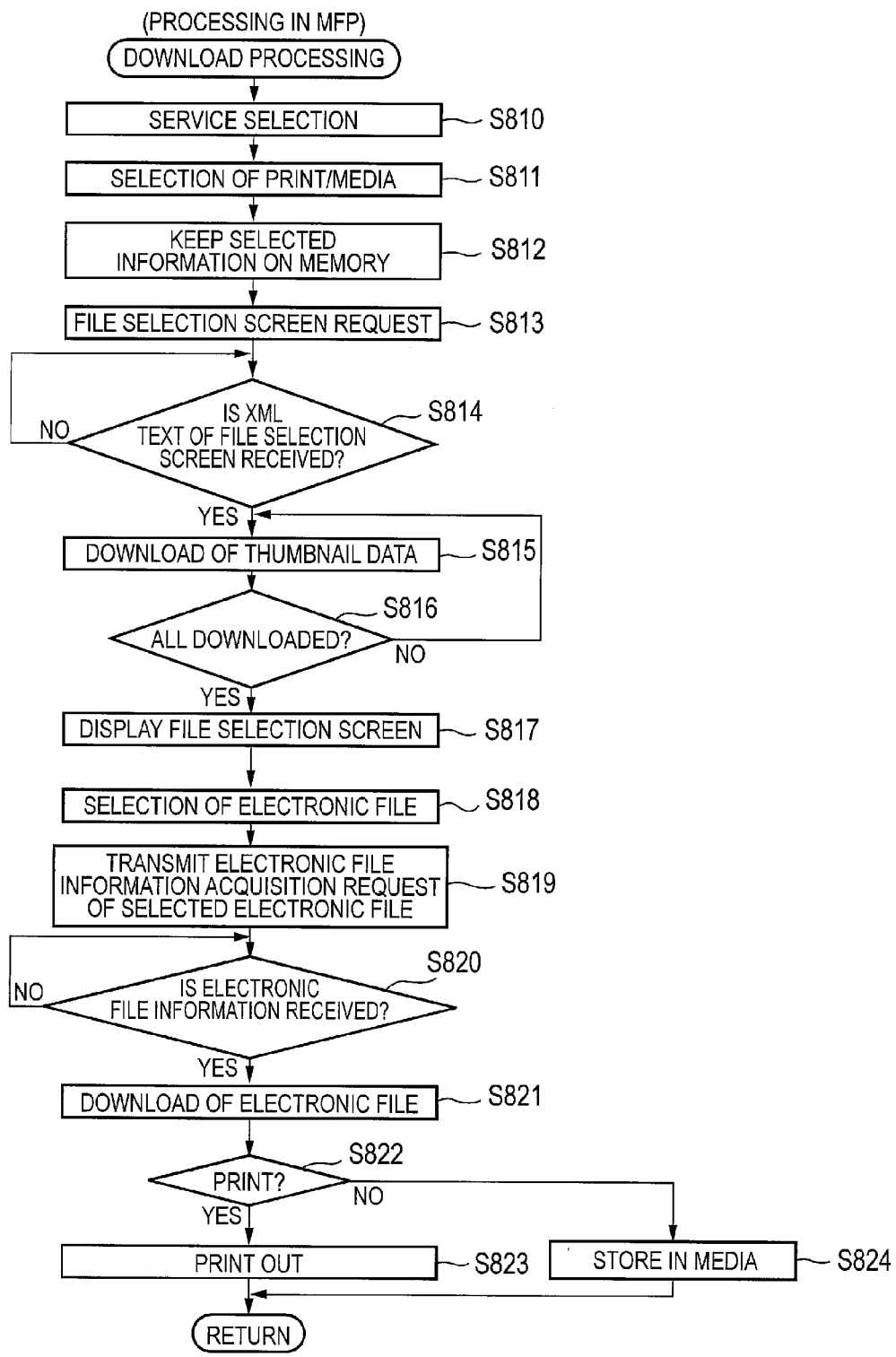
FIG. 8 is a flowchart showing download processing that is executed in the MFP.

FIG. 8 is a flowchart showing download processing that is executed by the CPU 101 of the MFP 100. The download processing starts up when execution of the download processing is instructed on a menu screen (not shown) of the MFP 100. When the download processing starts up, the CPU 101 displays a service selection screen on the LCD 109 and receives selection of a service that the user wants to use, from the input unit 108 (S810). When the selection of any one service is input from the input unit 108, the CPU 101 stores the service specifying information for specifying the service selected by the user in the RAM 103.

Then, the CPU 101 display a print/media selection screen on the LCD 109 and receives selection of a using method of the electronic file that the user will download, from the input unit 108 (S811). The print/media selection screen displays items of 'print' and 'media', as selection items of the using method of the electronic file to be downloaded from now. The 'print' item is an item enabling the electronic file, which will be downloaded, to be printed by the printer 106. The 'media' item is an item enabling the electronic file, which will be downloaded, to be stored. When the selection of the using method is input from the input unit 108, the CPU 101 stores the using method input in S811 in the RAM 103 (S812).

Then, the CPU 101 controls the network I/F 207 to transmit the file selection screen request to the relay apparatus 200 (S813). Here, the file selection screen request to be transmitted may be any one of the request including the first type format information 404 (refer to FIG. 4A) and the second type format information 406 (refer to FIG. 4B).

Then, the CPU 101 determines whether the MXL text of the file selection screen is received from the relay apparatus 200 through the network I/F 105 (S814). When the MXL text of the file selection screen is not received from the relay apparatus 200 (S814: No), the CPU 101 stands by until the MXL text of the file selection screen is received. On the other hand, when the MXL text of the file selection screen is received from the relay apparatus 200 (S814: Yes), the CPU 101 displays and configures an image, based on the XML text of the file selection screen. At this time, the CPU 101 reads out the URLs included in the MXL text one by one and transmits the thumbnail requests including the URLs to the network 400 through the network I/F 105. When a reply to the thumbnail request is received from the service provision apparatus 300 or relay apparatus 200 through the network I/F 105, the CPU 101 reads out a thumbnail from the received reply (S815).

Here, the URL included in the XML text is actually one of the thumbnail URL 408*b* and the converted thumbnail URL 412*b*. However, the MFP 100 prepares and transmits the thumbnail requests uniformly without distinguishing the thumbnail URL and the converted thumbnail URL. The thumbnail data that the MFP 100 downloads is one of the thumbnail data transmitted by the service provision apparatus 300 and the converted thumbnail data transmitted by the relay apparatus 200. However, the MFP 100 uniformly treats the thumbnail data and the converted thumbnail data as thumbnail data, without distinguishing the thumbnail data and the converted thumbnail data. Accordingly, in the flowchart of FIG. 8, the thumbnail data and the converted thumbnail data are collectively referred to as the thumbnail data.

Then, the CPU 101 determines whether the thumbnail data is downloaded or not, based on all the URLs included in the MXL text (S816). When a result of the determination in S816 is negative (S816: No), the CPU repeats the processing from S815. When the thumbnail data is downloaded based on all the URLs while the processing is repeated (S816: Yes), the CPU 101 displays the file selection screen having the thumbnails arranged thereon on the LCD 109 (S817). Then, when the user inputs the selection of the electronic file to be downloaded from the input unit 108, an input signal is input to the CPU 101 (S818).

When the input signal corresponding to the electronic file to be downloaded, which is selected by the user, is input from the input unit 108, the CPU 101 transmits the electronic file information acquisition request to the relay apparatus 200 (S819). The electronic file information acquisition request that is transmitted at this time includes the file specifying information 410 that specifies the electronic file selected by the user.

Then, the CPU 101 determines whether the electronic file URL is received from the relay apparatus 200 through the network I/F 105 (S820). Here, actually, the electronic file URL that is received by the MFP 100 is any one of the electronic file URL created in the service provision apparatus 300 and the electronic file URL created in the relay apparatus 200. However, since the MFP 100 does not discriminate both the electronic file URLs, the electronic file URL and the converted electronic file URL are collectively referred to as the electronic file URL in the flowchart of FIG. 8.

When the electronic file URL is not received (S820: No), the CPU 101 stands by until the electronic file URL is received from the relay apparatus 200 through the network I/F. On the other hand, when the electronic file URL is received from the relay apparatus 200 (S820: Yes), the CPU 101 controls the network I/F 105 to transmit a request based on the received electronic file URL to the network 400. When a reply to the transmitted request is received through the network I/F 105, the CPU reads out an electronic file (S821). Here, the electronic file that is received by the MFP 100 is actually one of the electronic file transmitted from the service provision apparatus 300 and the converted electronic file transmitted from the relay apparatus 200. However, since the MFP 100 does not discriminate both the electronic files, the electronic file URL and the converted electronic file are collectively referred to as the electronic file in the flowchart of FIG. 8.

After downloading the electronic file is downloaded as described above, the CPU 101 determines whether the using method stored in the RAM 103 in S812 is the 'print' (S822). When the using method selected by the user is the 'print' (S822: Yes), the CPU 101 enables the printer 106 to print the downloaded electronic file (S823) and ends the download processing. On the other hand, when the using method selected by the user is the 'media' (S822: No), the CPU 101 stores the downloaded electronic file in a media card mounted to the MFP 100 (S824) and ends the download processing.

According to this illustrative embodiment, the user can download the contents of the format that can be processed in the MFP 100 from the service provision apparatus 300 or relay apparatus 200 and display the thumbnails or print the electronic file.

In the above illustrative embodiment, the service cooperating system 10 is an example of the communication system and the MFP 100 is an example of the terminal. The CPU 201 that executes the conversion modules 204e, 204f is an example of the conversion means. The first type format information 404 is an example of the designation information and the second type format information 406 is an example of the terminal information. The URL is an example of the identification information, the thumbnail URL 408b and the electronic file URL 414b are an example of the first identification information and the converted thumbnail URL 412b and the converted electronic file URL 415b are an example of the second identification information. The module information 413b is an example of the conversion means correspondence information. The thumbnail data and the electronic file are an example of the contents and the converted thumbnail and the converted electronic file are an example of the converted contents. The type information 408a, 414a are an example of the additional information. The HDD 204 is an example of the storage unit.

The CPU 201 that executes S512 and S520 is an example of the first reception means. The CPU 201 that executes S522, S604 is an example of the determination means. The CPU 201 that executes S510 and S518 is an example of the designation information reception means and the terminal information reception means. The CPU 201 that executes S511 and S519 is an example of the format acquisition means. The CPU 201 that executes S516 and S526 is an example of the first transmission means and the second transmission means. The CPU 201 that executes S528 is an example of the second reception means. The CPU 201 that executes S704 is an example of the conversion control means. The CPU 201 that executes S536 is an example of the converted contents transmission means. The CPU 201 that executes S726 is an example of the acquisition means. The CPU 101 that executes S815 and S821 is an example of the contents acquisition means.

Although the invention has been described with reference to the illustrative embodiment, the invention is not limited to the illustrative embodiment. It is possible to easily suppose that a variety of modifications and changes can be made within the range without departing from the gist of the invention.

For example, in the above illustrative embodiment, the MFP 100 is an example of the terminal. However, a variety of apparatuses such as portable telephone and digital camera may be an example of the terminal. In the above illustrative embodiment, the relay apparatus 200 is one server that is physically provided. However, a virtual machine in which a plurality of physical apparatuses cooperates with each other and thus functions as one server may be also possible. The relay apparatus 200 of the above illustrative embodiment is provided by the manufacturer of the MFP 100. However, a well-known rental server may be also used.

FIG. 9A is a view schematically showing communication flow between the MFP 100 and the relay apparatus 200 configuring the service cooperating system 10 according to a modified embodiment. In the meantime, the MFP 100, the relay apparatus 200, the service provision apparatus 300 and a conversion server 600 shown in FIG. 9A are connected to each other through the network (refer to FIG. 1). In the modified embodiment, a server name of the relay apparatus 200 is 'service1.bro.com', a server name of the conversion server 600 is 'service2.bro.com' and a server name of the service provision apparatus 300 is 'serviceX.com.' Meanwhile, the electrical configuration of the relay apparatus 200 of this modified embodiment is the same as the relay apparatus 200 of the above illustrative embodiment, except that it does not have the data conversion program 204d and the conversion modules 204e, 204f.

In this modified embodiment, the file selection screen request is transmitted from the MFP 100 to the relay apparatus (1) and the relay apparatus 200 transmits the file list request to the service provision apparatus 300 (2). Then, the service provision apparatus 300 transmits the file list including the thumbnail specifying information 408 and the file specifying information 410 to the relay apparatus 200 (3). The data flow shown in the above (1) to (3) is the same as the above illustrative embodiment.

Then, the relay apparatus 200 of the modified embodiment determines whether the thumbnail data corresponding to the thumbnail specifying information 408 is the correspondence format of the MFP 100 by the same method as the above illustrative embodiment. When it is determined that the thumbnail data corresponding to the thumbnail specifying information 408 is the correspondence format of the MFP 100, the relay apparatus transmits the MXL text of the file selection screen including the thumbnail specifying information 408 to the MFP 100, in the same manner as the above illustrative embodiment.

On the other hand, when it is determined that the thumbnail data corresponding to the thumbnail specifying information 408 is the non-correspondence format, the relay apparatus 200 performs processing of changing the thumbnail specifying information 408 included in the file list into the converted thumbnail specifying information 412 (4). FIG. 9B is a view showing an example of the thumbnail specifying information 408 that the relay apparatus 200 of the modified embodiment receives from the service provision apparatus 300 and FIG. 9C is a view showing an example of the converted thumbnail specifying information 412 that is created from the thumbnail specifying information 408 shown in FIG. 9B. As shown in FIG. 9C, the converted thumbnail specifying information 412 of the modified embodiment designates the conversion server 600, as the server name 413a. A module name of a conversion module provided to the conversion server 600 is designated as the module information 413b. As the org parameter 413c, the thumbnail URL 408b included in the thumbnail specifying information 408 is designated.

As shown in FIG. 9A, the relay apparatus 200 transmits the MXL text of the file selection screen including the created converted thumbnail specifying information 412 (refer to FIG. 9C) to the MFP 100 (5). In the meantime, the MFP 100 transmits the thumbnail request including the received converted thumbnail URL 412b to the network (6). As described above, since the converted thumbnail URL 412b designates the conversion server 600 as the server name 413a, the thumbnail request is transmitted to the conversion server 600.

The conversion server 600 having received the thumbnail request analyzes the converted thumbnail URL 412b and creates the thumbnail request including the thumbnail URL 408b set in the org parameter 413c, transmits the same to the service provision apparatus 300 (7) and acquires the thumbnail data from the service provision apparatus 300 (8). That is, although the relay apparatus 200 first receives the thumbnail URL 408b from the service provision apparatus 300, since the thumbnail URL 408b is set in the org parameter 408b of the converted thumbnail URL 412b, it is possible to enable the conversion server 600 to acquire the thumbnail URL 408b acquired by the relay apparatus 200, through the MFP 100.

Then, the conversion server 600 converts the format of the received thumbnail data into the correspondence format to create the converted thumbnail data by using the conversion module of the data conversion program, which is designated by the module information 413b included in the converted thumbnail URL 412b, and transmits the created thumbnail data to the MFP 100 (10). That is, when it is determined in the relay apparatus 200 having first acquired the thumbnail URL 408b that the format of the thumbnail data corresponding to the thumbnail URL 408b is not the correspondence format that can be processed in the MFP 100, the relay apparatus 200 determines a conversion module for converting the thumbnail data into the correspondence format and sets the same as the module information 413b. Accordingly, even when the conversion server 600 does not know the correspondence format that can be processed in the MFP 100, the conversion server can create the thumbnail data in the designated conversion module and transmit the thumbnail data of an appropriate format to each MFP 100.

The aspect of the present disclosure can be configured to create the converted contents in a physically separate apparatus from the relay apparatus 200 and to transmit the same to the terminal, like the modified embodiment. Since the operational cost of the relay apparatus 200 is changed depending on an amount of the information via the relay apparatus 200 and the processing load in the relay apparatus 200, the modified embodiment can reduce the load caused in the relay apparatus 200, thereby suppressing the operational cost.

In the meantime, a plurality of conversion servers 600 may be provided. Thereby, the above modification may be further modified so that each conversion server 600 performs dedicated conversion.

The respective units provided to the relay apparatus may be dispersedly arranged in a plurality of apparatuses. For example, a separate apparatus may be enabled to perform only the processing of creating the converted URL. Like this, when a plurality of apparatuses interlockingly operates to function as the relay apparatus, a system including the plurality of apparatuses corresponds to an example of the relay apparatus.

In the above illustrative embodiment, the service provision apparatus 300 transmits the file list (refer to FIG. 4C) including the thumbnail specifying information 408 and the file specifying information 410 to the relay apparatus 200. However, the invention is not applied to only the service provision apparatus 300 of the above illustrative embodiment and can be applied to a variety of service provision apparatuses.

FIG. 10 is a view showing an example of the file list that is transmitted to the relay apparatus 200 in D003 of FIG. 3 from a service provision apparatus other than the service provision apparatus 300 of the above illustrative embodiment. In D003 of the above illustrative embodiment, the file list including the thumbnail specifying information 408 and the file specifying information 410 is replied to the relay apparatus 200 from the service provision apparatus 300. The file specifying information 410 specifically indicates the contents ID of the electronic file. In contrast, the file specifying information 410 included in the file list may include type information 410b indicating the format of the electronic file and an electronic file URL 410c in addition to a contents ID 410a, as shown in FIG. 10. When the file list shown in FIG. 10 is received, the relay apparatus 200 determines whether an electronic file corresponding to the file specifying information 410 is the correspondence format stored in the correspondence format storage area 203a, based on the type information 410b or extension included in the electronic file URL 410c, like the thumbnail specifying information 408. Then, the relay apparatus changes the file specifying information 410, which corresponds to the electronic file for which it is determined that the format thereof is the non-correspondence format, into converted file specifying information including a converted electronic file URL corresponding to a converted electronic file and transmits the MXL text of the file selection screen including the converted file specifying information to the MFP 100.

In this case, since the MFP 100 can acquire the converted electronic file URL from the XML text of the file selection screen, the MFP can transmit the electronic file request without the communication in D015 to D019 shown in FIG. 3.

The invention can be applied to a case where the service provision apparatus 300, which does not provide the thumbnail data, is used. In this case, the relay apparatus 200 may convert the electronic file received from the service provision apparatus 300 into thumbnail data and transmit the thumbnail data to the MFP 100. In this case, the data of a format reduced from the original data corresponds to an example of the 'predetermined format.'

A variety of data such as document file, voice file and moving picture file may correspond to an example of the contents. In this case, the relay apparatus 200 may transmit text data, which is created by converting voice included in the voice file into characters, to the MFP 100 as the converted contents. Alternatively, the relay apparatus may transmit a still image file, which is extracted from the moving picture file, to the MFP 100 as the converted contents.

In the above illustrative embodiment, the relay apparatus 200 receives the thumbnail request or electronic file request from the MFP 100 and then creates and transmits the converted contents to the MFP 100. Instead of this configuration, the relay apparatus may create and store the converted contents in advance before receiving the thumbnail request or electronic file request.

FIG. 11 is a flowchart showing relay processing that is executed in the relay apparatus 200 according to a modified embodiment. Meanwhile, the same steps of the relay processing of the modified embodiment shown in FIG. 11 as the relay processing of the above illustrative embodiment described with reference to FIG. 5 are indicated with the same reference numerals and the descriptions thereof are omitted.

In the relay processing of the modified embodiment, when the electronic file information is acquired from the service provision apparatus 300 (S520), the CPU 201 of the relay apparatus 200 determines whether an electronic file, which corresponds to the electronic file URL included in the electronic file information, is the correspondence format (S522). When it is determined that the electronic file is not the correspondence format (S522: No), the CPU 201 acquires the electronic file corresponding to the electronic file URL from the service provision apparatus 300 (S1102). Then, the CPU 201 calls out the data conversion program 204*d*, enables the conversion modules 204*e*, 204*f* to create a converted electronic file by using the acquired electronic file (S1104) and stores the created converted electronic file in the HDD 204 and the like of the relay apparatus 200 (S1106). In the meantime, the processing that is executed in S1104 is processing of calling out the data conversion program 204*d* and creating the converted electronic file, like S532 of FIG. 5 described in the above illustrative embodiment. However, the detailed descriptions thereof are here omitted. Then, the CPU creates a converted URL corresponding to the converted contents stored in the HDD 204 and the like (S1108) and transmits the electronic file information including at least the created converted URL to the MFP 100 (S526). Meanwhile, in this modified embodiment, in the file selection screen preparation processing (S514), when it is determined that the thumbnail data corresponding to the thumbnail URL 408*b* is not the correspondence format, the relay apparatus receives the thumbnail data from the service provision apparatus 300 and creates and stores the converted thumbnail data in the HDD 204 and the like, like the electronic file. However, the detailed descriptions thereof are omitted.

Then, when the converted URL included in the thumbnail request or electronic file request is received from the MFP 100 (S1110: Yes), the CPU 201 reads out the converted contents corresponding to the converted URL from the HDD 204 and transmits the same to the MFP 100 (S1111).

In this case, since the converted contents created and stored in advance are transmitted to the MFP 100, it is possible to rapidly transmit the converted contents, compared to the configuration in which the thumbnail request or electronic file request is received and then the converted contents are created. Meanwhile, in this modified embodiment, the CPU 201 that executes S1106 corresponds to an example of the storage means.

In the above illustrative embodiment, the JPEG has been exemplified as an example of the predetermined format that can be processed in the MFP 100. However, the invention is not limited to the JPEG format. For example, a variety of formats such as PNG format, GIF format, BMP format and TIFF format may correspond to an example of the predetermined format.

One MFP 100 may process data of a plurality of formats. In this case, one format may be selected based on an output condition and converted contents of the selected format may be transmitted to the MFP 100 from the relay apparatus 200.

Specifically, the relay apparatus 200 beforehand stores the formats corresponding to the respective output conditions of the converted contents in the HDD 204 and the like. The relay apparatus receives the output conditions of the contents with being included in the file selection screen request or electronic file information acquisition request from the MFP 100 and selects the format corresponding to the received output condition of the contents. Then, the relay apparatus creates and transmits the converted contents of the selected format to the MFP 100.

For example, for a case where the JPEG format and the RAW format are available for the MFP 100, when a printing condition designates a high image quality printing, the relay apparatus creates the converted contents of the RAW format that has a large amount of data but is suitable for the high image quality printing and transmits the same to the terminal. In the meantime, when the printing condition designates a printing that puts a high priority on the high-speed processing, the relay apparatus may create the converted contents of the JPEG format having the smaller amount of data than the RAW format and transmit the same to the terminal. Based on the printing condition received from the terminal, it may be possible to change the number of pixels and the compression ratio of the converted contents.

By doing so, it is possible to enable the MFP 100 to acquire the contents of a format corresponding to the output condition. In this case, the CPU 201 that executes the processing of S510 and S518 corresponds to an example of the terminal output condition reception means and the CPU 201 that selects the format corresponding to the output condition in S511 and S519 corresponds to an example of the selection means.

In the above illustrative embodiment, the module information 413*b* included in the converted URL (converted thumbnail URL and converted electronic file URL) is the name of the conversion modules 204*e*, 204*f*. However, instead of this, the module information 413*b* may be configured with any character string corresponding to one of the conversion modules 204*e*, 204*f*. In this case, when the relay apparatus 200 receives the converted URL from the terminal, the relay apparatus may create the converted contents by using the conversion modules 204*e*, 204*f* corresponding to any character string.

The relay apparatus 200 of the above illustrative embodiment performs the communication with the terminal and the communication with the service provision apparatus 300 in accordance with the http. In this case, there is an advantage that the system can be established by using the general Web service infrastructure. Instead of this, the relay apparatus may perform the communication in accordance with the https or xmpp. When the xmpp is used, it is possible to implement the system by using an interactive communication procedure.

In the above illustrative embodiment, the relay apparatus 200 acquires the format (predetermined format) of the contents that is available for the MFP 100, based on the information transmitted from the MFP 100. However, the above illustrative embodiment may be modified in such a manner that formats such as JPEG format, which can be used in all terminals using the relay apparatus 200, are preset in advance and the relay apparatus determines the format of the contents.

In the above illustrative embodiment, the URL is an example of the identification information. However, the identification information is not limited thereto. For example, any information that can specify the data may be possible.

In the above illustrative embodiment, the format that is available for the MFP 100 is a format that can be display-output and printing-output. However, instead of this, a format that can be display-output but cannot be printing-output and a format that can be printing-output but cannot be display-output may be also an example of the 'processible format.' In this case, for example, the file selection screen request (D001 in FIG. 3) may include the first type format information 404 indicating the displayable format and may be transmitted to the relay apparatus 200 from the MFP 100. By doing so, it is possible to enable the MFP 100 to acquire the thumbnail data of the format that can be display-output in the MFP 100. In the meantime, for example, the electronic file information acquisition request (D015 in FIG. 3) may include the first type format information 404 indicating the printable format and may be transmitted to the relay apparatus 200 from the MFP 100. By doing so, it is possible to enable the MFP 100 to acquire the electronic file of the format that can be printing-output in the MFP 100. That is, the processible format that is notified to the relay apparatus 200 from one terminal may be different for a case of requesting data for display and for a case of requesting data for printing.

What is claimed is:

1. An information processing system comprising:
a terminal device comprising a first processor, a first interface, and a display; and
a relay apparatus comprising a second processor and a second interface, wherein the second interface is configured to communicate with a service provider and the terminal device, and wherein the service provider is different from the relay apparatus and the terminal device and stores a first content therein,
wherein the second processor is configured to:
receive a first selection screen request including first type format information from the terminal device;
store in a memory a first format indicated by the first type format information;
generate and transmit a file list request to the service provider;
receive a file list from the service provider in response to transmitting the file list request, the file list including first individual file information, the first individual file information including thumbnail specifying information and file specifying information, the thumbnail specifying information including first type information and a first thumbnail URL, the first thumbnail URL indicating a first location of the service provider that stores thumbnail data, the first type information indicating a first thumbnail data format; and
determine whether the first thumbnail data format indicated by the first type information is identical to the first format stored in the memory,
wherein when the first thumbnail data format indicated by the first type information is identical to the first format stored in the memory, the second processor is configured to:
generate a first XML text including the first thumbnail URL; and
transmit the generated first XML text to the terminal device,
wherein the first processor is configured to:
generate a first thumbnail request including the first thumbnail URL;
transmit the first thumbnail request to the service provider in accordance with the first thumbnail URL; and
receive a first thumbnail image data from the service provider in response to transmitting the first thumbnail request, the first thumbnail image data being in the first thumbnail data format; and display a particular thumbnail image based on the first thumbnail image data on a display,
wherein when the first thumbnail data format indicated by the first type information is not identical to the first format stored in the memory, the second processor is configured to:
convert the thumbnail specifying information into a converted thumbnail specifying information, the converted thumbnail specifying information including second type information, the first thumbnail URL, and a second thumbnail URL, the second thumbnail URL indicating a conversion from the first thumbnail data format to a second location of the relay apparatus, the second type information indicating a second thumbnail data format different from the first thumbnail data format;
generate a second XML text including the second thumbnail URL and the first thumbnail URL; and
transmit the generated second XML text to the terminal device,
wherein the first processor is configured to:
generate a second thumbnail request including the second thumbnail URL and the first thumbnail URL; and
transmit the second thumbnail request to the relay apparatus in accordance with the second thumbnail URL included in the second thumbnail request,
wherein the second processor is configured to:
receive the second thumbnail request from the terminal device;
generate a third thumbnail request in accordance with the first thumbnail URL;
transmit the third thumbnail request to the service provider;
receive a second thumbnail image data from the service provider in response to transmitting the third thumbnail request, the second thumbnail image data being in a second thumbnail data format different from the first thumbnail data format;
convert the second thumbnail image data into a third thumbnail image data, the third thumbnail image data being in the first thumbnail data format; and
transmit the third thumbnail image data to the terminal device,
wherein the first processor is further configured to:
receive the third thumbnail image data from the relay apparatus; and display the particular thumbnail image based on the third thumbnail image data on the display.

2. The information processing system according to claim 1, wherein the second processor is configured to:
receive a first electronic file information acquisition request including first type format information from the terminal device;
store in a memory a first format indicated by the first type format information;
generate and transmit an electronic file information request to the service provider;
receive an electronic file information from the service provider in response to transmitting the electronic file information request, the electronic file information including first type information and first electronic file URL, the first electronic file URL indicating a first location of the service provider that stores electronic file, the first type information indicating a first electronic file data format; and
determine whether the first electronic file data format indicated by the first type information is identical to the first format stored in the memory,
wherein when the first electronic file data format indicated by the first type information is identical to the first format stored in the memory, the second processor is configured to:
transmit the first electronic file information including the first electronic file URL to the terminal device,
wherein the first processor is configured to:
generate a first electronic file request including the first electronic file URL;
transmit the first electronic file request to the service provider in accordance with the first electronic file URL;
receive a first electronic file data from the service provider in response to transmitting the first electronic file request, the first electronic file data being in the first electronic file data format; and
print an image based on the received electronic file,
wherein when the first electronic file format indicated by the first type information is not identical to the first format stored in the memory, the second processor is configured to:
convert the electronic file information into a converted electronic file information, the converted electronic file information including second type information and second electronic file URL, the second electronic file URL indicating a second location of the relay apparatus, the second type information indicating a second electronic file data format; and
transmit the converted electronic file information to the terminal device,
wherein the first processor is configured to:
generate a second electronic file request including the second electronic file URL and the first electronic file URL; and
transmit the second electronic file request to the relay apparatus in accordance with the second electronic file URL,
wherein the second processor is configured to:
receive the second electronic file request from the terminal device;
generate a third electronic file request in accordance with the first electronic file URL included in the second electronic file request;
transmit the third electronic file request to the service provider;
receive a second electronic file data from the service provider in response to transmitting the third electronic file request, the second electronic file data being in a second electronic file data format different from the first electronic file data format;
convert the second electronic file data into a third electronic file data, the third electronic file data being in the first electronic file data format; and
transmit the third electronic file data to the terminal device,
wherein the first processor is further configured to:
receive the third electronic file data from the relay apparatus; and
print an image based on the received third electronic file.

3. An information processing system comprising:
a terminal device comprising a first processor, a first interface, and a display; and
a relay apparatus comprising a second processor and a second interface, wherein the second interface is configured to communicate with a service provider and the terminal device, and wherein the service provider is different from the relay apparatus and the terminal device and stores a first content therein, wherein the second processor is configured to:
receive a first electronic file information acquisition request including first type format information from the terminal device;
store in a memory a first format indicated by the first type format information;
generate and transmit an electronic file information request to the service provider;
receive an electronic file information from the service provider in response to transmitting the electronic file information request, the electronic file information including first type information and first electronic file URL, the first electronic file URL indicating a first location of the service provider that stores electronic file, the first type information indicating a first electronic file data format; and
determine whether the first electronic file data format indicated by the first type information is identical to the first format stored in the memory,
wherein when the first electronic file data format indicated by the first type information identical to the first format stored in the memory, the second processor is configured to:
transmit the first electronic file information including the first electronic file URL to the terminal device,
wherein the first processor is configured to:
generate a first electronic file request including the first electronic file URL;
transmit the first electronic file request to the service provider in accordance with the first electronic file URL;
receive a first electronic file data from the service provider in response to transmitting the first electronic file request, the first electronic file data being in the first electronic file data format; and
print an image based on the received electronic file,
wherein when the first electronic file format indicated by the first type information is not identical to the first format stored in the memory, the second processor is configured to:
convert the electronic file information into a converted electronic file information, the converted electronic file information including second type information and the first electronic file URL, second electronic file URL, the second electronic file URL indicating a second location of the relay apparatus, the second type information indicating a conversion from the first electronic file data format to second electronic file data format different from the first electronic file data format; and transmit the converted electronic file information to the terminal device, wherein the first processor is configured to:

generate a second electronic file request including the second electronic file URL and the first electronic file URL; and transmit the second electronic file request to the relay apparatus in accordance with the second electronic file URL, wherein the second processor is configured to:

receive the second electronic file request from the terminal device;

generate a third electronic file request in accordance with the first electronic file URL included in the second electronic file request;

transmit the third electronic file request to the service provider;

receive a second electronic file data from the service provider in response to transmitting the third electronic file request, the second electronic file data being in a second electronic file data format different from the first electronic file data format;

convert the second electronic file data into a third electronic file data, the third electronic file data being in the first electronic file data format; and transmit the third electronic file data to the terminal device, wherein the first processor is further configured to:

receive the third electronic file data from the relay apparatus; and print an image based on the received third electronic file.

4. A relay apparatus comprising:

an interface configured to communicate with a service provider and a terminal device, wherein the service provider is different from the relay apparatus and the terminal device and stores a first content therein; and a processor configured to:

receive a first electronic file information acquisition request including first type format information from the terminal device;

store in a memory a first format indicated by the first type format information;

generate and transmit an electronic file information request to the service provider;

receive an electronic file information from the service provider in response to transmitting the electronic file information request, the electronic file information including first type information and first electronic file URL, the first electronic file URL indicating a first location of the service provider that stores electronic file, the first type information indicating a first electronic file data format; and determine whether the first electronic file data format indicated by the first type information is identical to the first format stored in the memory, wherein when the first electronic file data format indicated by the first type information is identical to the first format stored in the memory, the processor is configured to:

transmit the first electronic file information including the first electronic file URL to the terminal device, wherein when the first electronic file format indicated by the first type information is not identical to the first format stored in the memory, the processor is configured to:

convert the electronic file information into a converted electronic file information, the converted electronic file information including second type information, the first electronic file URL, and second electronic file URL, the second electronic file URL indicating a second location of the relay apparatus, the second type information indicating a conversion from the first electronic file data format to a second electronic file data format different from the first electronic file data format;

transmit the converted electronic file information to the terminal device;

receive a second electronic file request from the terminal device, the second electronic file request including the second electronic file URL and the first electronic file URL;

generate a third electronic file request in accordance with the first electronic file URL included in the second electronic file request;

transmit the third electronic file request to the service provider;

receive a second electronic file data from the service provider in response to transmitting the third electronic file request, the second electronic file data being in a second electronic file data format different from the first electronic file data format;

convert the second electronic file data into a third electronic file data, the third electronic file data being in the first electronic file data format; and transmit the third electronic file data to the terminal device.

* * * * *